US008462378B2

(12) United States Patent  (10) Patent No.: US 8,462,378 B2
Takeda et al. (45) Date of Patent: Jun. 11, 2013

(54) IMAGE FORMING APPARATUS FOR PRODUCING PLURAL IMAGES ON A SINGLE SHEET WITH A USER SELECTED INTEGRATION PATTERN

(75) Inventors: Hideki Takeda, Osaka (JP); Hiroaki Shiba, Osaka (JP)

(73) Assignee: Kyocera Mita Corporation (JP)

( * ) Notice: Subject to any disclaimer, the term of this patent is extended or adjusted under 35 U.S.C. 154(b) by 1312 days.

(21) Appl. No.: 11/904,424

(22) Filed: Sep. 27, 2007

(65) Prior Publication Data
US 2008/0259376 A1 Oct. 23, 2008

(30) Foreign Application Priority Data

Sep. 29, 2006 (JP) ................................. 2006-267003
Mar. 26, 2007 (JP) ................................. 2007-079526

(51) Int. Cl.
 *G06K 15/00* (2006.01)
(52) U.S. Cl.
 USPC ............ 358/1.18; 358/1.2; 358/2.1; 358/540; 345/635; 345/629; 345/650; 345/661; 715/204; 715/243; 715/246; 715/277
(58) Field of Classification Search
 USPC ................... 358/1.9, 1.2, 2.1, 1.18, 505, 501, 358/540; 345/635, 650, 661, 629; 715/204, 715/243, 246, 274, 277
 See application file for complete search history.

(56) References Cited

U.S. PATENT DOCUMENTS

| 6,084,988 | A | 7/2000 | Kanno et al. | |
| 6,822,663 | B2* | 11/2004 | Wang et al. | 715/854 |
| 7,177,045 | B2* | 2/2007 | Goel et al. | 358/1.18 |
| 2003/0020956 | A1* | 1/2003 | Goel et al. | 358/1.18 |
| 2003/0056180 | A1* | 3/2003 | Mori | 715/530 |
| 2005/0073714 | A1* | 4/2005 | Makishima | 358/1.15 |
| 2005/0204145 | A1* | 9/2005 | Makishima | 713/182 |
| 2006/0114488 | A1* | 6/2006 | Motamed | 358/1.13 |
| 2006/0158706 | A1* | 7/2006 | Mori et al. | 358/540 |
| 2006/0221358 | A1* | 10/2006 | Takahashi | 358/1.1 |
| 2006/0250630 | A1* | 11/2006 | Mori | 358/1.13 |
| 2007/0086055 | A1* | 4/2007 | Ishibashi | 358/1.18 |

FOREIGN PATENT DOCUMENTS

| CN | 1174344 | | 2/1998 |
| JP | 10191018 | | 7/1998 |
| JP | 2001-148774 | | 5/2001 |
| JP | 2004282439 | A * | 10/2004 |
| JP | 2005123911 | | 5/2005 |
| JP | 2005303835 | | 10/2005 |
| JP | 2007110392 | | 4/2007 |

* cited by examiner

*Primary Examiner* — King Poon
*Assistant Examiner* — Jamares Q Washington
(74) *Attorney, Agent, or Firm* — Gerald E. Hespos; Michael J. Porco; Matthew T. Hespos

(57) ABSTRACT

An image forming apparatus is provided to enable a user to integrate plural images on a single sheet in a pattern controlled by the user. The apparatus includes an image acquiring portion that acquires document images, and integration pattern determining portion that makes settings relating to the integration and an integrated document image generating portion that generates the integrated document images corresponding to the integration pattern. The apparatus includes a print portion that prints the integrated document images.

11 Claims, 14 Drawing Sheets

IMAGE FORMING APPARATUS FOR PRODUCING PLURAL IMAGES ON A SINGLE SHEET WITH A USER SELECTED INTEGRATION PATTERN

BACKGROUND OF THE INVENTION

1. Field of the Invention

The present invention relates to an image forming apparatus, such as a copying machine, and an image forming method, and more particularly, to an image forming apparatus and method capable of performing integrated copying.

2. Description of the Related Art

There has been a widespread use of an image forming apparatus, such as a copying machine, of a type configured to perform so-called integrated copying, by which plural pages of documents placed on the document table are read and the sizes of plural document images obtained by the reading are reduced and integrated to make a copy of these document images on a single recording sheet (see, for example, JP-A-2001-148774). When performing integrated copying, for example, in a case where two or four pages of documents are integrated into a single recording sheet, as are shown in FIG. 14A or 14B, the user is requested to choose one integration pattern among integration patterns denoted by reference numerals 901 through 904 or reference numerals 905 through 908.

In the prior art, however, the integration patterns are predetermined, that is, they are formatted, and the user is allowed to make an integrated copy only in an integration pattern chosen from the formatted integration patterns. When the user wishes to make an integrated copy in an integration pattern other than the predetermined ones, he or she has to make reduced copies and lay out the reduced copies in an integrated pattern he or she desires, which takes a considerable time and labor.

SUMMARY OF THE INVENTION

An object of the invention is to provide an image forming apparatus that enables the user to make an integrated copy in an integration pattern he or she desires.

An image forming apparatus in an aspect of the invention includes: a document image acquiring portion that acquires a document image; an integration pattern determining portion that makes settings relating to integration for each integrated document image when plural document images are integrated into a recording sheet as integrated document images and thereby determines an integration pattern of the integrated document images for the recording sheet; an integrated document image generating portion that generates the integrated document images corresponding to the integration pattern from the document images acquired by the document image acquiring portion according to the integration pattern determined by the integration pattern determining portion; and a print portion that prints the integrated document images generated by the integrated document generating portion onto the recording sheet in the integration pattern.

DETAILED DESCRIPTION OF THE PREFERRED EMBODIMENTS

Figure 1:
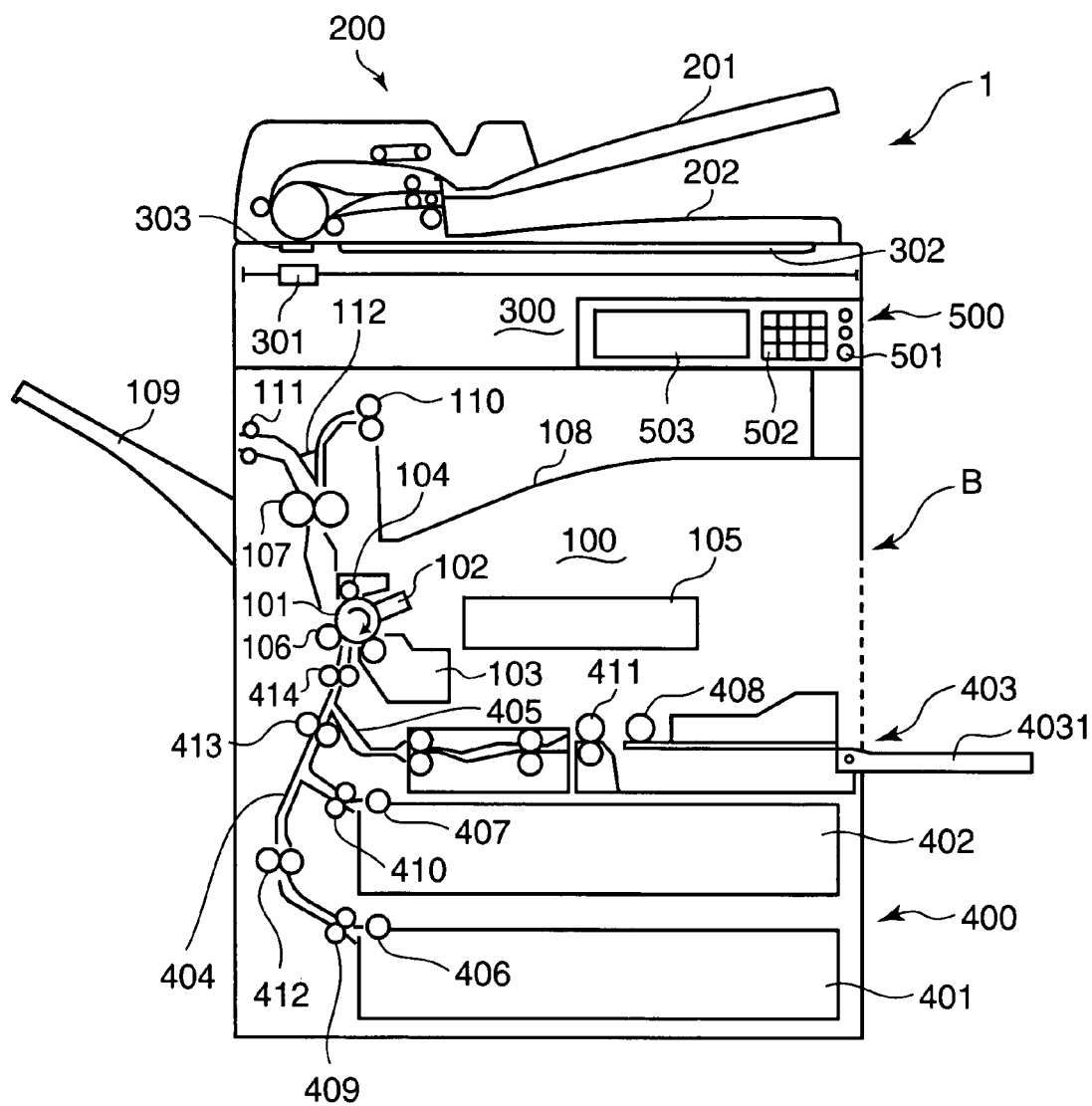
FIG. 1 is a cross section schematically showing the internal configuration of a copying machine as an example of an image forming apparatus according to one embodiment of the invention.

Hereinafter, an image forming apparatus of the invention will be described with reference to the drawings. FIG. 1 is a cross section schematically showing the internal configuration of a copying machine 1, which is an example of an image forming apparatus according to one embodiment of the invention. The copying machine 1 includes a main body B, an image forming portion 100 accommodated in the main body B, a document feeding portion 200 provided above the main body B equipped with the image forming portion 100, a document reading portion 300 provided on top of the main body B, a sheet feeding portion 400 provided at the bottom of the main body B, and an operation display portion 500 provided in a front portion of the main body B.

The document reading portion 300 reads a document and generates document data corresponding to the document. The document reading portion 300 is formed of a scanner 301 provided with a CCD (Charge Coupled Device) sensor, an exposing lamp, and so forth to generate image data from an optically acquired image of the document, and it includes a first platen glass 302 for document reading by apparatus and a second platen glass 303 for document reading by ADF on the top surface thereof. The document reading portion 300 scans a document placed on the first platen glass 302 or a document being transported while coming into contact with the second platen glass 303 by the document feeding portion 200, and outputs image data thus acquired to a control portion 2 described below.

The document feeding portion 200 (ADF) performs a series of document feeding operations from a feeding operation of a document placed on a document tale 201 to the document reading portion 300 (the document reading position on the second platen glass 303) to a discharging operation of the document read by the document reading portion 300 to a document discharging portion 202 of the document feeding portion 200. The document feeding portion 200 is configured to be retractable with respect to the top surface of the main body B (document reading portion 300) about the rotation supporting point (rotation center shaft) set on the back surface side of the apparatus. Hence, by lifting up the document feeding portion 200 backward so that the top surface of the first platen glass 302 (second platen glass 303) is open, the user is able to place a document to be read, for example, a book in a double-page spread state, on the top surface of the first platen glass 302.

The sheet feeding portion 400 feeds a sheet to the image forming portion 100. The sheet feeding portion 400 includes plural sheet feeding cassettes in which sheets (recording sheets) of various sizes, such as B5-, A4-, B4-, and A3-size sheets, are accommodated, for example, sheet feeding cassettes 401 and 402, and a manual sheet feeing portion 403 formed of a manual tray 4031 or the like configured to be openable and closable at one side of the main body B. The sheet feeding portion 400 also includes a transportation path 404 through which a sheet is transported from the sheet feeding cassette 401 or 402 to the image forming portion 100 and a transportation path 405 through which a sheet is transported from the manual sheet feeding portion 403 to the image forming portion 100.

The sheet feeding cassettes 401 and 402 and the manual sheet feeding portion 403 respectively include pick-up rollers 406, 407, and 408 for picking up accommodated sheets, sheet feeding roller pairs 409, 410, and 411 for feeding sheets one by one to the corresponding transportation paths. The transportation path 404 is provided with transportation roller pairs 412 and 413 for transporting sheets and a registration roller pair 414 for holding a sheet being transported in a standby state before the image forming portion 100. The transportation path 405 merges with the transportation path 404 downstream of the registration roller pair 414.

The image forming portion 100 forms (prints) a specific image onto a sheet transported by the sheet feeding portion 400. The image forming portion 100 includes a photoconductive drum 101 supported in a rotatable manner in a direction indicated by an arrow in the drawing, and a charging portion 102, a developing portion 103, a cleaning portion 104, a laser scanning unit 105, and a transfer roller 106 provided on the periphery of the photoconductive drum 101, as well as a fixing roller pair 107 provided downstream of the transfer roller 106.

The charging portion 102 charges the peripheral surface of the photoconductive drum 101 uniformly at specific potential. The laser scanning unit 105 forms an electrostatic latent image on the peripheral surface of the photoconductive drum 101 by irradiating a laser beam to the peripheral surface of the photoconductive drum 101 according to image data transmitted from an image memory portion 30 or the like described below. The developing portion 103 provides toner particles to let them adhere to the electrostatic latent image in turning the electrostatic latent image into a visible image (document image). The transfer roller 106 transfers the toner image made visible on the photoconductive drum 101 onto a transported sheet while keeping the sheet pressed against the photoconductive drum 101. The fixing roller pair 107 fixes the toner image thus transferred to the sheet. The fixing roller pair 107 is formed of a heat roller and a pressure roller (neither is shown in the drawing), and melts the toner particles on the sheet with heat from the heat roller and fixes the toner particles onto the sheet by applying a pressure with the use of the pressure roller. The cleaning portion 104 cleans toner particles remaining on the peripheral surface of the photoconductive drum 101 after transferring of the image onto the sheet ends.

Sheet discharge trays 108 and 109 are provided to the top portion and the side face portion of the main body B, respectively, so that a sheet transported from the fixing roller pair 107 is discharged onto the sheet discharge tray 108 or 109 by a corresponding discharge roller pair 110 or 111. Transportation directions of a sheet can be switched between the discharge roller pair 110 side and the discharge roller pair 111 side by a discharge branching guide 112.

The operation display portion 500 inputs a specific instruction according to an operation by the user. The operation display portion 500 includes a start key 501 for the user to input a print execution instruction, a numeric keypad 502 used to input the number of print copies or the like, and a display device 503 formed of a liquid crystal display (LCD) that displays not only operation guide information for the user to input settings for various copy operations but also various operation buttons. The display device 503 is formed of a so-called touch panel (operation panel) with which the user is able to input an instruction (input a command) by depressing or touching the display surface with his or her finger or the like. This embodiment is chiefly characterized in that the user sets an integration pattern as he or she desires using an integration setting screen displayed on the touch panel, that is to say, the user is able to customize an integration pattern as he or she desires. The configuration and the operations relating to this characteristic will be described in detail below.

Figure 2:
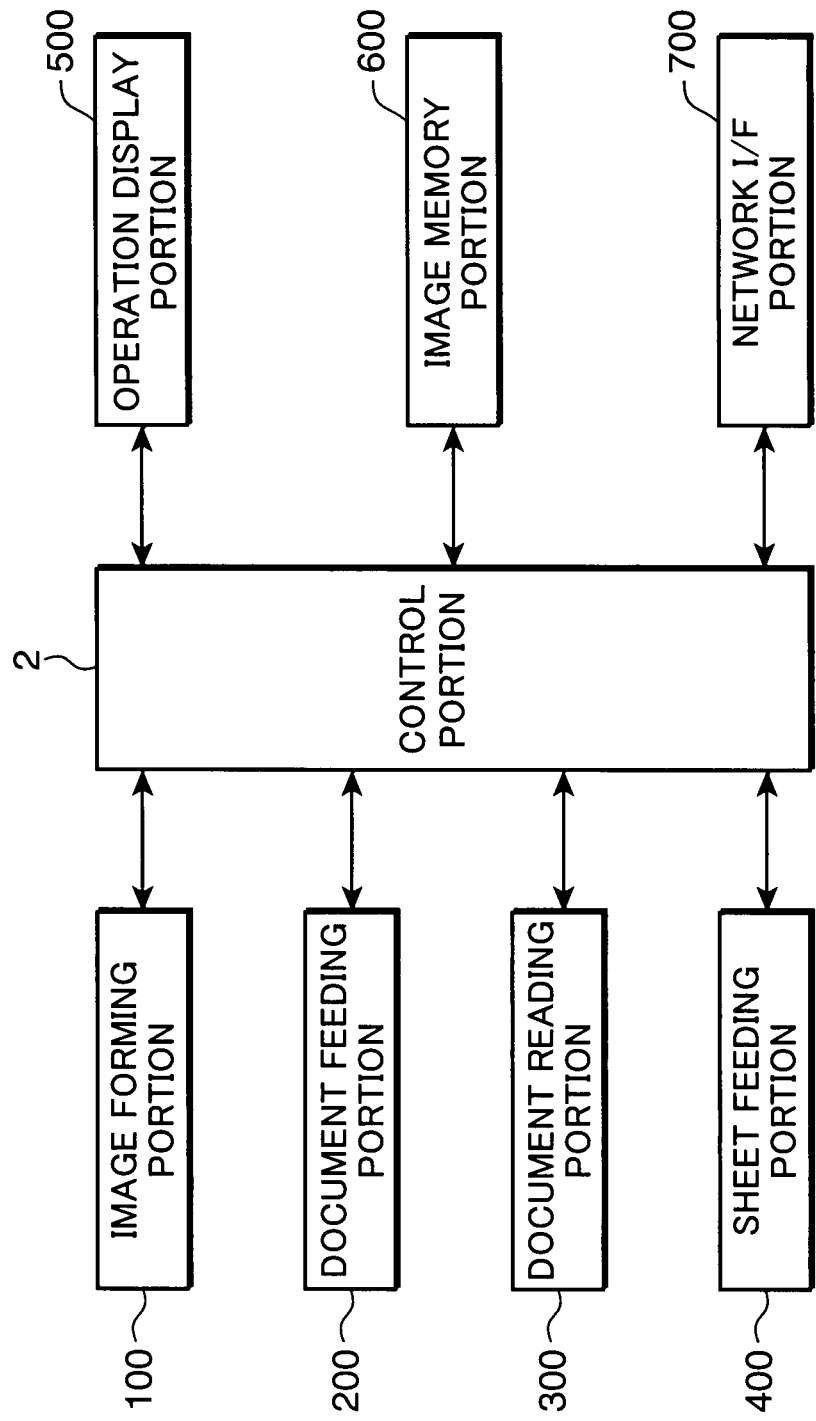
FIG. 2 is a block diagram schematically showing the configuration of the copying machine shown in FIG. 1.

FIG. 2 is a block diagram schematically showing the configuration of the copying machine 1 shown in FIG. 1. The copying machine 1 includes the control portion 2 responsible for the operation control of the overall apparatus. The control portion 2 is formed of a ROM (Read Only Memory) that stores a control program of the copying machine 1, a RAM (Random Access Memory) that temporarily saves data, a micro computer that reads out the control program or the like from the ROM to run the program thereon, and so forth. It controls the overall apparatus according to specific instruction information inputted on the operation display portion 500 or the like and detection signals from various sensors provided to various places in the apparatus. The control portion 2 is connected to the image forming portion 100, the document feeding portion 200, the document reading portion 300, the sheet feeding portion 400, and the operation display portion 500 described above as well as an image memory portion 600 and a network I/F portion 700.

The image memory portion 600 is a memory that temporarily stores image data of a document read by the document reading portion 300 and image data transmitted from a specific external device (for example, an information processing apparatus, such as a personal computer: PC) via the network I/F portion 700. The network I/F portion 700 controls transmissions and receptions of various kinds of data between the image forming apparatus and the external apparatus connected to each other via a network, such as the LAN (Local Area Network).

Figure 3:
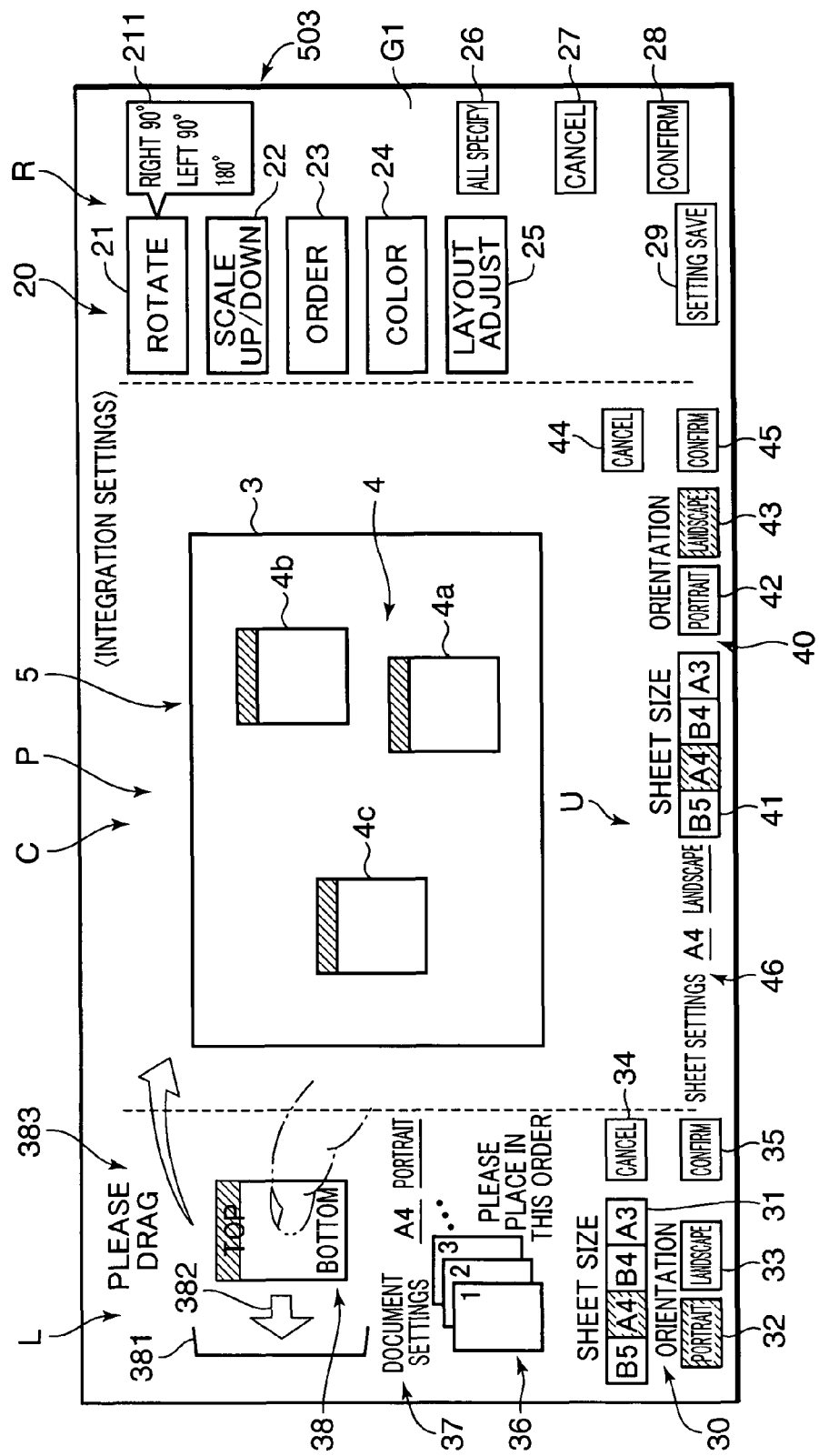
FIG. 3 is a view schematically showing an example of an integration setting screen displayed on a display device of the copying machine shown in FIG. 1.
Figure 4:
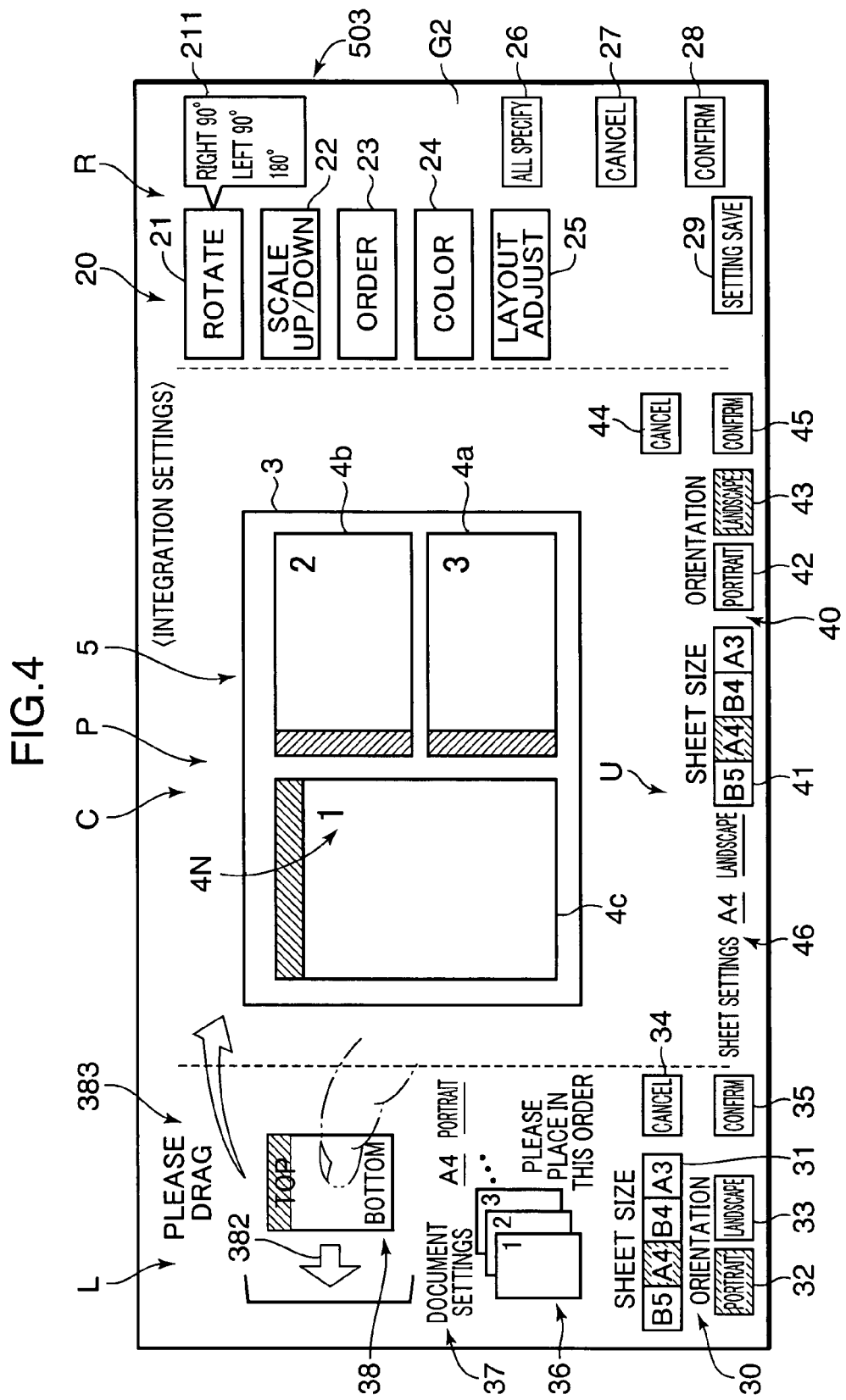
FIG. 4 is a view schematically showing another example of the integration setting screen displayed on the display device of the copying machine shown in FIG. 1.

The settings of an integration pattern, which is one of major characteristics of this embodiment, will now be described. FIG. 3 and FIG. 4 respectively show integration setting screens G1 and G2 as examples of an integration setting screen displayed on the display device 503. The configuration of the integration setting screens G1 and G2 and operations involved with the integration settings will be described first.

As are shown in FIG. 3 and FIG. 4, the integration setting screen G1 on the display device 503 displays an integration pattern image 5 formed by combining an image (referred to as the sheet image) 3 representing a sheet and images (referred to as the integrated document images) 4 representing documents to be integrated into the sheet image 3, thereby reflecting the setting state of the current integration pattern so to speak, in a region, for example, almost the center portion C. Various button groups and settings information used to input various instructions relating to the integration settings are displayed in a display region on the periphery of a display region of the integration pattern image 5 (referred to as the integration pattern image display region P), herein, in display regions R and L on the right and the left, respectively, and a display region U on the lower side of the display device 503.

<Display Region R on the Right>

On the display region R on the right is displayed an integration settings button group 20 for making integration settings of respective integrated document images 4 and formed of a rotate button 21, a scale up/down button 22, an order button 23, a color button 24, a layout adjust button 25, an all specify button 26, a cancel button 27, a confirm button 28, and a setting save button 29, and so forth.

The rotate button 21 is a button for inputting an instruction to rotate the orientations of the integrated document images 4 displayed in the integration pattern image 5 to change the orientations thereof. The scale up/down button 22 is a button for inputting an instruction to display the integrated document images 4 in the reduced or enlarged form.

The order button 23 is a button for inputting an instruction to set the order in alignment of respective integrated document images 4 in the integration pattern image 5, that is, to set the layout positions when integrated.

The color button 24 is a button for inputting an instruction to specify whether the integrated document images 4 are printed in color (or printed in monochrome).

The layout adjust button 25 is a button for inputting an instruction to adjust the layout (alignment) of the integrated document images 4 automatically in response to a manual operation by the user, more specifically, by touching and dragging them with his or her finger in the integration pattern image 5 as will be described below.

The all specify button 26 is a button for inputting an instruction to specify all the integrated document images 4 displayed in the integration pattern image 5 when making settings as to the rotation, the scaling up or down, the order, the color, and so forth.

The cancel button 27 is a button for inputting an instruction to cancel specifications of the integrated document images 4 when making the settings as to the rotation, the scaling up or down, the order, the color, and so forth. The confirm button 28 is a button for inputting an instruction to confirm the settings as to the rotation, the scaling up or down, the order, the color, and so forth.

The setting save button 29 is a button for inputting an instruction to save information about the integration pattern acquired by the respective integration settings as above. It should be appreciated, however, that the information about the integration pattern to be saved may be integration information about the integrated document images 4 alone (integration original documents 4*a* through 4*c* alone) or integration information additionally including information about the size and the orientation of the sheet image 3 (integration information about the whole made of the sheet image 3 and the respective document images 4 displayed in the integration pattern image 5).

<Display Region L on the Left>

On the display region L on the left are displayed a document settings button group 30 for making settings of documents and formed of a document size button 31, document orientation buttons 32 and 33, a cancel button 34, a confirm button 35, and so forth, and a guide image 36 for displaying so-called guidance information that specifies operations for the user by providing (notifying) the order (page alignment of a document bundle to be placed) in which documents are to be placed on the document table 201, a document settings information image 37 for displaying information about the current settings of documents, a generation button 38 for generating integrated document images 4 to be displayed in the integration pattern image 5, and so forth.

The document size button 31 is a button to specify the document size. The document orientation buttons 32 and 33 are buttons to specify the orientation of the documents, that is, whether the documents are portrait or landscape. The cancel button 34 is a button to cancel the settings of the documents, and the confirm button 35 is a button to confirm the settings of the documents.

The guide image 36 displays plural pages of documents in the form of a picture showing a state where they are slightly displaced from one another and overlap one on top of another, and information specifying the order, such as 1, 2, 3, and so on, is displayed at a specific position in each document starting from the forefront one. Herein, the guide image 36 is an image (fixed image) only to let the user pay attention to the "order" and the orientation of documents is not reflected therein. However, it may be configured so as to display an image (image that changes) reflecting the orientation of the documents according to the document settings information as with the generation button 38 described below. The copying machine 1 performs integrated copying on the assumption that the documents are placed in this order.

The document settings information image 37 is displayed, for example, as is shown in FIG. 3, in the form of text information specifying the document size (herein, A4 size: A4) and the document orientation (herein, portrait: PORTRAIT) set by the document settings button group 30.

As the user touches a portion where the generation button 38 is displayed with his or her finger or the like and moves the generation button 38 into the integration pattern image display region P by sliding his or her finger over the screen while keeping the touch to the screen (moves his or her finger by sliding with a contact), that is, as the user performs an operation to drag the generation button 38 into the integration pattern image display region P, a document image same as a document image currently displayed on the generation button 38 (an image schematically representing a document instead of displaying the content of a document, for example, an icon, which is referred to as the button document image), that is, a copy image (button document image) of the generation button 38, is generated and displayed within the integration pattern image display region P as the integrated document image 4.

By repetitively performing this operation, the user is able to generate an arbitrary number of integrated document images 4 he or she wishes be integrated. The button document image (integrated document image 4) generated within the integration pattern image display region P is also referred to as the reference document image as a term to mean the document image used as the reference (base) in the integration settings described below.

The button document image on the generation button 38 is displayed so as to reflect the orientation of the document (herein, portrait) set by the document settings button group 30 (the document orientation buttons 32 and 33), that is, the button document image in the set orientation is displayed. The document size is not reflected herein. In addition, information to determine the orientation of documents to be placed, that is, for example, information enabling the user to distinguish top from bottom of the documents (referred to as the top and bottom information), is displayed together with the button document image on the generation button 38. it may be information to distinguish right from left.

In this embodiment, for example, the end at the top is crosshatched and displayed in a specific color. The display method is not limited to this method, and any display method, such as a specific character and mark, can be adopted as long as which side is up can be distinguished. Even when the orientation of the button document image is changed, for example, to landscape, the top and bottom positions of the button document image are displayed so that the upper side in FIG. 3 is the top and the lower side in FIG. 3 is the bottom, in other words, they are displayed so as to coincide with the top and bottom positions of the current portrait button document image. they do not necessarily coincide with the top and the bottom according to the actual document content.

At the point in time when the integrated document image 4 is generated within the integration pattern image display region P from the generation button 38, the top and bottom positions (orientation) of the integrated document image 4 coincide with the top and bottom positions (orientation) of the button document image on the generation button 38. A state (orientation, integration size, and layout) of the button document image thus generated is used as default, and integration settings are made to the default as needed.

The generation button 38 is displayed together with a document transportation inlet image 381 indicating the document table 201 or the transportation inlet (orientation thereof) of the placed documents and an arrow 382 specifying the transportation direction of the documents. Owing to these displays, the user can readily determine (visually confirm) in which orientation the documents should be placed when he or she actually places the documents on the document table 201. In addition, as is indicated by a numeral reference 383, an arrow image specifying a finger moving direction or a dragging direction together with a message, "please drag", may be displayed for the generation button 38. This enables the user to perform an operation for the integration settings without any confusion, which enhances the operation performance.

The generation button 38 is displayed at a position closer to the integration pattern image display region P, so that it can be readily generated within the integration pattern image region P via dragging or the like, that is, it is dragged over a shorter distance. It is, however, preferable to set the display position of the generation button 38 with respect to the integration pattern image display region P by taking into account how easily the user can perform dragging depending on the dominant hand, that is, whether he or she is right-handed or left-handed. In this embodiment, the generation button 38 is located at the position shown in FIG. 3 on the assumption that it is easier for a right-handed user to perform dragging from left to right.

<Display Region U on the Lower Side>

On the display region U on the lower side are displayed a sheet settings button group 40 for making settings of a sheet and formed of a sheet size button 41, sheet orientation buttons 42 and 43, a cancel button 44, a confirm button 45, and so forth, and a sheet settings information image 46 to display the current sheet settings information. The sheet size button 41 is a button to specify a sheet size. The sheet orientation buttons 42 and 43 are buttons to specify the orientation of a sheet, that is, whether the sheet is portrait or landscape. The cancel button 44 is a button to cancel the settings of a sheet, and the confirm button 45 is a button to confirm the settings of a sheet. The sheet settings information image 46 displays the sheet size (herein, A4 size) and the sheet orientation (herein, landscape: LANDSCAPE) set by the sheet settings button group 40, for example, in the form of text information, as is shown, for example, in FIG. 3.

It should be appreciated that the display positions of the various button groups and the settings information are not limited to those shown in FIG. 3 and FIG. 4. For example, they may be displayed in a display region on the upper side instead of the display region U on the lower side, the display contents on the right and left sides may be reversed, or they may be displayed collectively in a region on either one side instead of being displayed on both the right and left sides. The configuration of the buttons and the configuration to display the settings information in the respective regions may be arbitrarily.

An operation in a case where three pages of documents (integrated document images 4) are integrated into a single sheet (sheet image 3) will be described as an example of the integration settings together with more detailed setting operations and configuration of the integration settings button group 20 and the like. It should be noted that when N integrated document images are integrated into a single sheet, it is expressed as N-in-1. The integration herein is therefore expressed as 3-in-1.

The settings of the size and the orientation of documents and the size and the orientation of a sheet are made first (it does not make any difference whether the settings for which of the former or the latter are made first). The user sets the sheet size to an A4 size and the sheet orientation to landscape by touching (depressing), for example, the button portion allocated to the A4 size in the sheet size button 41, touching the sheet orientation button 43, and then touching the confirm button 45. Accordingly, A4 and LANDSCAPE are displayed in the sheet settings information image 46 and a landscape sheet image (image schematically representing a sheet) is displayed within the integration pattern image display region P.

It may be configured in such a manner that the touched buttons, that is, the sheet size button 41 (the button portion allocated to the A4 size) and the sheet orientation button 43, change a display color so that the user can know that these buttons are currently chosen. In addition, when the user touches the cancel button 44 after the sheet settings are made, the screen may be changed to a state where all the sheet settings are canceled and no setting is chosen (a state where the display color changed once is returned to the original color), or a default setting state, which is, for example, a state where the A4 size and the landscape orientation are set. The same applies to the cancel button 34 described below.

Subsequently, the user sets the document size to the A4 size and the document orientation to portrait by touching, for example, the button portion allocated to the A4 size in the document size button 31, touching the document orientation button 32, and then touching the confirm button 35. Accordingly, A4 and PORTRAIT are displayed in the document settings information image 37 and the button document image on the generation button 38 is displayed in the portrait orientation.

The user then repetitively performs the operation to drag the button document image from the generation button 38 three times. Three integrated document images 4, for example, integrated document images 4a, 4b, and 4c in this order, are thus generated at desired positions (approximate positions are acceptable) in the integration pattern image display region P or the sheet image 3 already displayed in the integration pattern image display region P. The user then chooses any of the three integrated images 4 he or she wishes to change its orientation by touching this integrated document image 4. When the user wishes to choose all the integrated document images 4 collectively at a time, he or she touches the all specify button 26. Alternatively, the user may choose all the integrated document images 4 using the all specify button 26 first, and then he or she touches any integrated document image 4 he or she wishes be deleted, which consequently enables the user to choose the rest of the integrated document images 4 (the same applies to descriptions below).

Herein, for example, the user chooses two integrated document images 4a and 4b by touching each. When touched, each integrated document image 4 thus chosen displays information to let the user know it is chosen, more specifically, for example, a display color of the chosen integrated document image 4 is changed. When the user subsequently touches the rotate button 21, information to set (specify) in which orientation and to which extent the integrated document image 4 is to be rotated, for example, alternatives (optional items) to rotate the integrated document image 4 clockwise by 90°, counterclockwise by 90°, or by 180°, is displayed in the form of a specific instruction input image 211 (pop-up image or small window). When the user chooses a portion displaying, for example, LEFT 90°, among the alternatives by touching this portion, the integrated document images 4a and 4b rotate counterclockwise by 90°.

Subsequently, the user scales up or down the respective integrated document images 4 to a desired size. The user first chooses any integrated document image 4 he or she wishes be scaled up or down among the three integrated document images 4 by touching the corresponding one(s). The user first chooses the integrated document image 4c by touching it and then touches the scale up/down button 22. As with the instruction input image 211, information to set to which extent the integrated document image 4 is to be scaled up or down, for example, an instruction input image (not shown) that enables the user to set an arbitrary value or choose one of plural fixed values as the relative value (percentage: %) or the absolute value of scaling up or down, or to specify an integration percentage (fixed value) by making a choice among all the integration percentages, such as 2-in-1, 3-in-1, and 4-in-1, are displayed for the scale up/down button 22 (for example, at the adjacent position). Herein, the user specifies 2-in-1 as the integration percentage for the integrated document image 4c.

When the integration percentage (2-in-1) is chosen, the integrated document image 4c is automatically scaled up or down to the size that matches the integration percentage of 2-in-1 with respect to the sheet image 3. Likewise, the user chooses the integration document images 4a and 4b in a state rotated counterclockwise by 90° by touching them and specifies, for example, the integration percentage of 4-in-1. The integrated document images 4a through 4c are thus changed into a state shown in the integration setting screen G2 of FIG. 4. It should be noted that the integrated document images 4 are scaled up or down where the integrated document images 4 are currently present. Hence, in a case where the integrated document images 4 overlap one on top of another after they are scaled up or down, the user may drag and move the integrated document images 4 to desired positions so that they will not overlap one on top of another (the user may adjust the positions manually).

Subsequently, the user sets the alignment sequence (order, allocation) of the documents (document images) for the integrated document images 4a through 4c set as above. In this case, the user touches the order button 23 first, and then touches the integrated document images 4 in a desired order for the integrated document images 4a through 4c. The alignment sequence is thus set, that is, the order is set in the order in which they are touched. In this instance, as is indicated by alpha-numeral 4N, information (order information 4N), such as a numeral specifying at what number in the order it is touched, may be displayed at a specific location in each integrated document image 4. In addition to the display of the order information 4N, a display color of the touched integrated document image 4 may be changed.

When the user makes a mistake in order, he or she may touch the order button 23 to make the settings again from the start. Alternatively, when the user finds that he or she made a mistake in order for the integrated document image 4 he or she just touched, he or she may cancel the order settings for this integrated document image 4 alone by touching this integrated document image 4 again in succession.

The method of setting the alignment sequence is not limited to the method described above. For example, the user may choose one integrated document image 4 first by touching it and then touches the order button 23 for this choice, after which, as with the method described above, he or she chooses the order (numeral) he or she wishes to set from the instruction input image 211 in which numerals from 1 to N are displayed as alternatives.

Subsequently, the user sets whether the integrated document images 4a through 4c are printed in color. In this case, as with the case described above, the user chooses any integrated document image 4 he or she wishes be printed in color by touching the corresponding one(s). When he or she wishes all of them be printed in color, he or she may touch the all specify button 26 to specify them collectively at a time. It should be noted that in order to perform color printing, it is necessary to prepare color document images. The color document images may be those acquired by reading color documents by the document reading unit 300 (ADF) or those transmitted from a PC or the like via the network I/F portion 700. In a case where no color documents are handled, the color settings will not be performed. It may be set as default to automatically print all the integrated document images 4 in monochrome unless the user touches the color button 24.

The layout of the integrated document images 4a through 4c can be adjusted as needed during the integration settings (until the settings are confirmed by the confirm button 28) manually, that is, by touching any integration document image 4 he or she wishes be adjusted to move it directly via dragging. In this instance, information about the position of the integrated document image 4 that is being touched for a position adjustment, for example, the coordinate position (not shown) with respect to the sheet image 3, may be displayed.

Figure 6A:
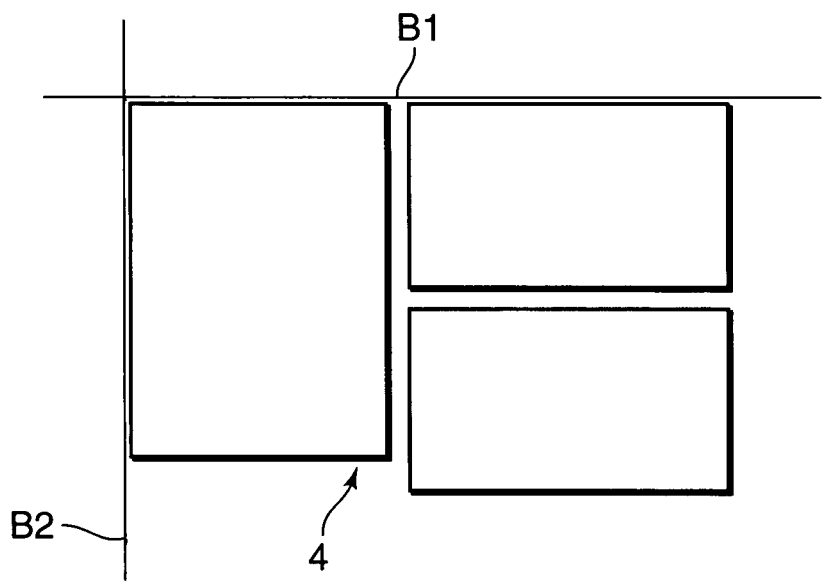
FIG. 6A is a view schematically showing an example of a layout adjustment of integrated document images in a case where the layout is adjusted in reference to one end.
Figure 6B:
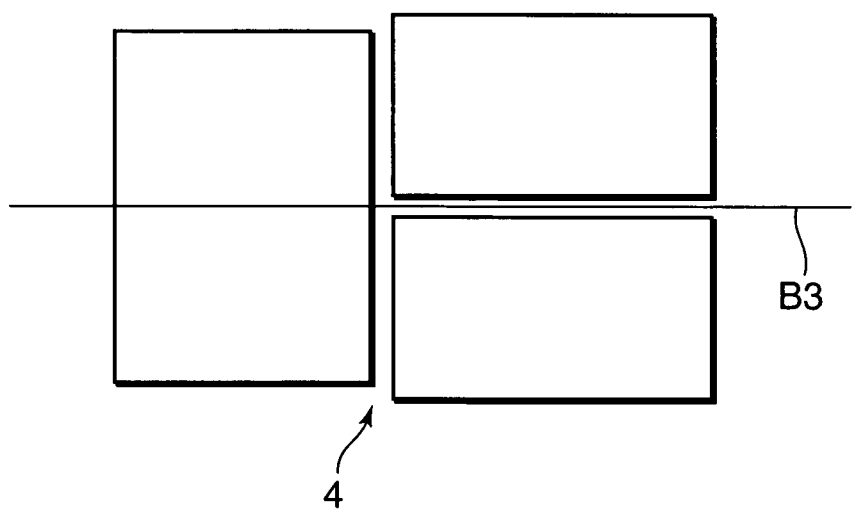
FIG. 6B is a view schematically showing another example of the layout adjustment of integrated document images in a case where the layout is adjusted in reference to the center.

As has been described, the layout of the integrated document images 4 can be adjusted manually. The adjustment, however, may be performed automatically by the layout adjust button 25. To be more concrete, it may be configured in such a manner that when the user touches the layout adjust button 25, the layout (layout positions) of the respective integrated document images 4 is adjusted with respect to the sheet image 3. More specifically, for example, as is shown in FIG. 6A, intervals among the respective integrated document images 4 or the positions of the end sides may be automatically adjusted in reference to, for example, a reference line B1 or B2 (either one reference line is sufficient) on one end side of the respective integrated document images 4. Alternatively, as is shown in FIG. 6B, the positions maybe adjusted automatically in the same manner in reference, for example, to the center line B3. The reference of the automatic layout adjustment can be set arbitrarily.

When the contents of the integration settings made up to this point are acceptable, the user confirms the integration settings by touching the confirm button 28. The user then moves to an actual integrated copying operation. In a case where the user cancels the integration settings (all the settings) made up to this point collectively at a time, he or she may depress the cancel button 27. Alternatively, the cancel button 27 may not be used as a button to cancel all the settings collectively at a time, and instead, it may be configured in such a manner that, for example, by touching the button for the settings the user wishes be cancelled, for example, the rotate button 21, after he or she touches the cancel button 27, he or she is able to cancel the settings for rotation alone. The order of integration settings are not necessarily in order of rotation, scaling up/down, order, color, and so on as specified above, and the settings can be made in an arbitrary order. In any case, however, the button configuration and the specifying method that enable the integration settings to be made and cancelled flexibly are preferable.

The integration pattern is determined by making the integration settings as described above. It may be configured in such a manner that information about the integration pattern is saved in a specific memory as the user touches the settings save button 29, so that the information is read out and used later as needed. A touch panel configuration may be additionally provided, so that the user is able to provide arbitrary name (for example, file name) information to the integration pattern when the information is saved.

Figure 5:
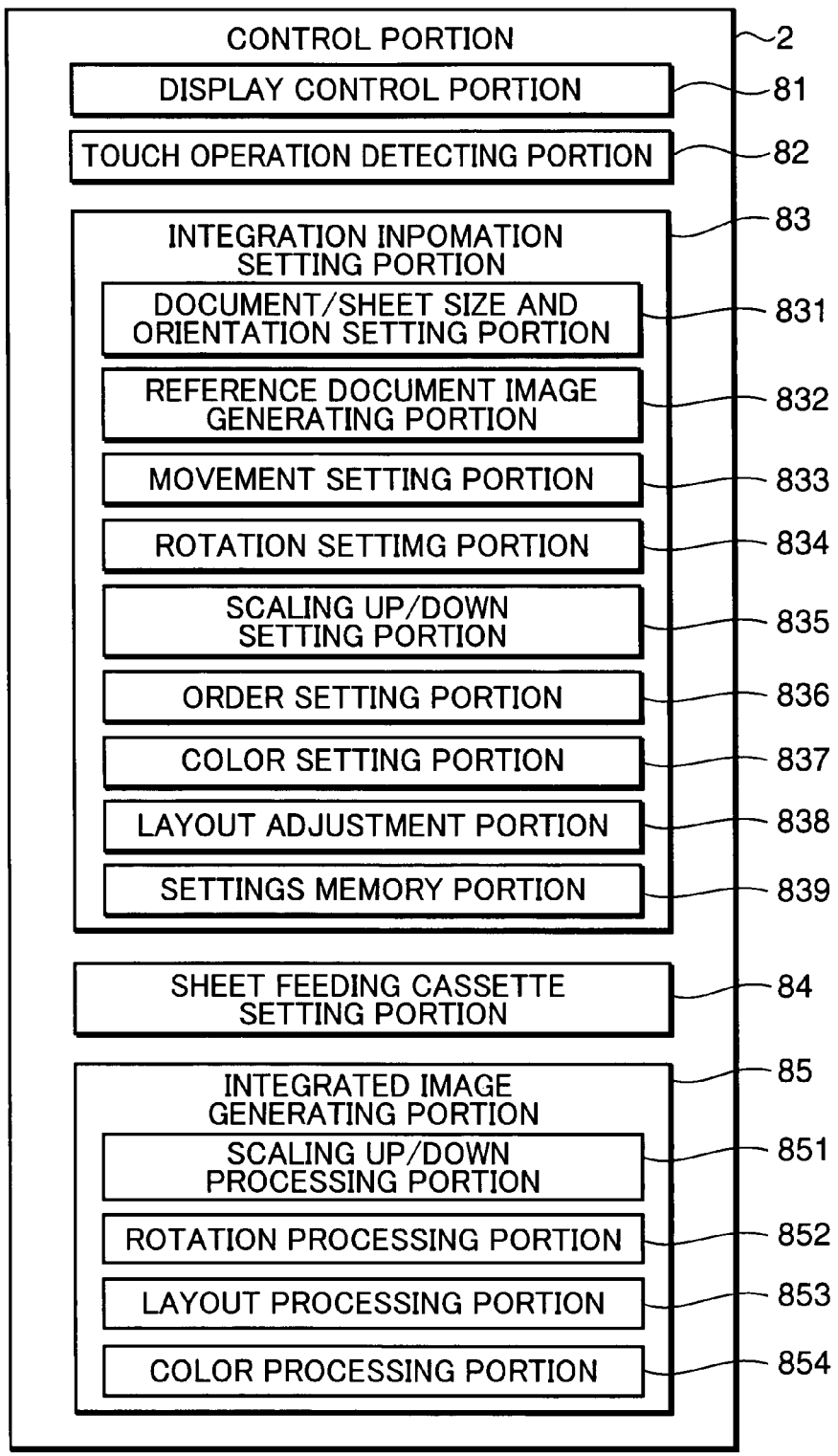
FIG. 5 is a block diagram of a control portion shown in FIG. 2 chiefly relating to integration settings.

FIG. 5 is a block diagram of the control portion 2 shown in FIG. 2 chiefly relating to the integration settings. As is shown in the drawing, the control portion 2 includes a display control portion 81, a touch operation detecting portion 82, an integration information setting portion 83, a sheet feeding cassette setting portion 84, and an integrated image generating portion 85.

The display control portion 81 controls a screen display on the display 503, that is, a display, such as the integration setting screens G1 and G2. The touch operation detecting portion 82 detects a touching operation on various buttons on the respective integration setting screens and the integration pattern image 5 (the sheet image 3 and the integrated document images 4) displayed on the display device 503, in short, it detects whether any of these portions is depressed (touched) by the finger or the like. The integration information setting portion 83 sets integration information by the integrated document images 4 and the sheet image 3, that is, the integration pattern.

The integration information setting portion 83 includes a document/sheet size and orientation setting portion 831, a reference document image generating portion 832, a movement setting portion 833, a rotation setting portion 834, a scaling up/down setting portion 835, an order setting portion 836, a color setting portion 837, a layout adjustment portion 838, and a settings memory portion 839.

The document/sheet size and orientation setting portion 831 sets the size and the orientation of documents according to an instruction input from the document settings button group 30 and sets the size and orientation of a sheet (sheet image 3) according to an instruction input from the sheet settings button group 40.

The reference document image generating portion 832 generates reference document images (integrated document images 4) from the generation button 38. This generation operation is performed at a point in time when the user touches the generation button 38, for example, with his or her finger, or at a point in time when the finger reaches inside the integration pattern image display region P by an operation like dragging.

The movement setting portion 833 moves the positions of the integrated document images 4 on the integration setting screen (G1 or G2), that is, moves the integrated document images 4 in a dragging direction as the integrated document images 4 are dragged, and sets the positions of the moved destinations.

The rotation setting portion 834 moves the integrated document images 4 by rotation on the integration setting screen according to an instruction input by the rotate button 21, and sets the rotated positions.

The scaling up/down setting portion 835 scales up or down the integrated document images 4 on the integration setting screen according to an instruction input by the scale up/down button 22, and sets the scaled up or down sizes (positions).

The order setting portion 836 sets the alignment sequence (order) of the documents for the respective integrated document images 4 (for example, the integrated document images 4*a* through 4*c*) according to an instruction input by the order button 23.

The color setting portion 837 makes the settings as to which integrated document image 4 among all the integrated document images 4 is printed in color according to an instruction input by the color button 24.

The settings memory portion 839 stores the integration settings information, that is, information about the determined integration pattern, according to an instruction input by the setting saves button 29.

The rotation setting portion 834, the scaling up/down setting portion 835, the order setting portion 836, the color setting portion 837, and the layout adjustment portion 838 are configured in such a manner so as not only to display the instruction input image 211 when the integration settings are made, but also to perform the setting operations according to the instructions inputted from the instruction input image 211.

The sheet feeding cassette setting portion 84 makes the settings as to a sheet in which sheet feeding cassette is used for actual printing as the set sheet according to the information (sheet settings information) about the sheet size and the sheet orientation set in the document/sheet size and orientation setting portion 831.

The sheet cassette setting portion 84 detects a current accommodation state (the sheet size and orientation of each sheet feeding cassette) of sheets in each sheet feeding cassette, or it may have stored the set information as the default value, and chooses from which sheet feeding cassette a sheet is to be fed according the sheet accommodation information and the sheet settings information. In practice, it chooses a sheet feeding cassette in which sheets of a sheet size same as the set sheet size are accommodated (the orientations may be different). The orientation of the sheet can be rotated at the time of integrated copying so that the integrated images (respective integrated document images 4) are aligned with the orientation of the sheets in this sheet feeding cassette.

The integrated image generating portion 85 actually generates integrated images (for example, the integrated document images 4a through 4c shown in FIG. 4) corresponding to the integration pattern from the document images acquired by reading the documents using the document reading portion 300 according to the integration pattern information (integration information) set in the integration information setting portion 83 and the sheet accommodation information set in the sheet feeding cassette setting portion 84. The integrated image generating portion 85 includes a scale up/down processing portion 851, a rotation processing portion 852, a layout processing portion 853, and a color processing portion 854.

The scaling up/down processing portion 851 performs scaling up or down processing to the respective document images according to the integration pattern information and the sheet accommodation information, so that they are scaled up or down to the sizes of the corresponding integrated document images 4 in the integration pattern.

The rotation processing portion 852 performs rotation processing to the respective document images according to the integration pattern information and the sheet accommodation information, so that the document images are oriented in the same direction as the corresponding integrated document images with respect to the sheet image 3 in the integration pattern.

The layout processing portion 853 performs layout processing to the respective document images according to the integration pattern information and the sheet accommodation information, so that the document images are fit (laid out) at the layout positions of the corresponding integrated document images with respect to the sheet image 3 in the integration pattern.

The color processing portion 854 performs processing to make the integrated document images in the form of color images or monochrome images (referred to as color processing) according to the integration pattern information depending on the settings as to whether the respective integrated document images are printed in color in the integration pattern. To be more concrete, when the document image corresponding to a given integrated document image is a color image, the color processing portion 854 performs processing to output this color image in the form of a color image intact or to convert this color image to a monochrome image. Meanwhile, when the document image is a monochrome image, it performs the processing to output this monochrome image in the form of a monochrome image intact.

As has been described, the integration pattern is set in the integration information setting portion 83 by the control portion 2 through operations on the integration setting screen, and a correspondence between the size and the orientation of the document images (document image information acquired by reading documents of the set size placed on the document table 201 by taking the orientation into account) and the size and the orientation of sheets actually accommodated in the sheet feeding cassette (sheet accommodation information set in the sheet feeding cassette setting portion 84) is adjusted (determined) to coincide with this integration pattern (a state of the integration pattern image 5), after which image formation (integrated copying) is performed in the integration pattern by the image forming portion 100.

Incidentally, the above has chiefly described a case where the integrated document images 4 (for example, the integrated document images 4a through 4c shown in FIG. 3 and FIG. 4) are integrated into a single sheet image 3. However, it may be configured in such a manner that plural pages of documents are integrated across plural sheet images 3, for example, in the case of ten pages of documents, as is shown in FIG. 11, the document images thereof, that is, ten integrated document images 4d through 4m (allocated with numerals 1 through 10, respectively) are divided into groups each including a specific number of them and integrated in plural, for example, three sheet images 3a through 3c.

Figure 9:
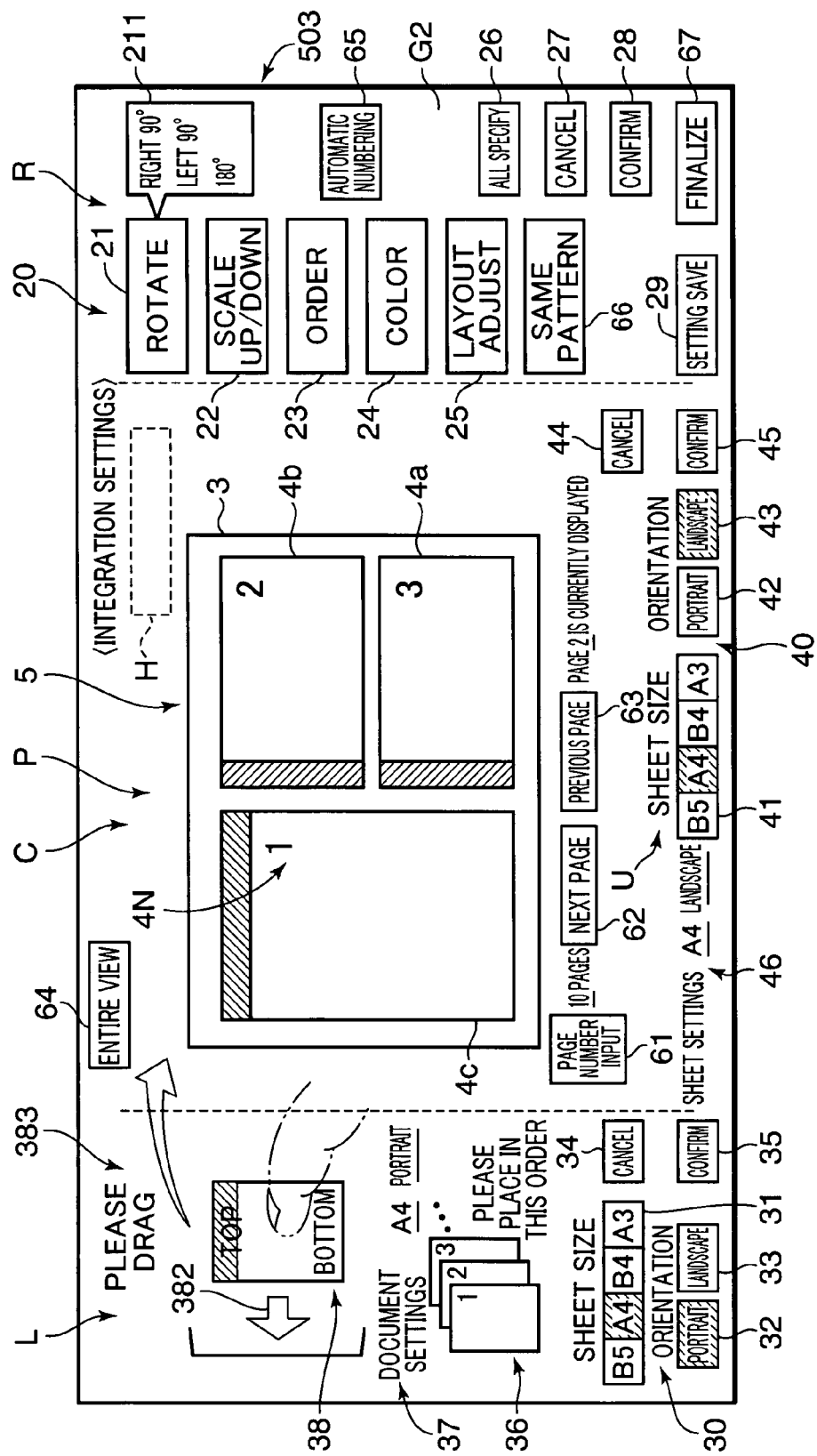
FIG. 9 is a view schematically showing still another example of the integration setting screen to describe the integration settings of plural integrated document images across plural sheet images.
Figure 11:
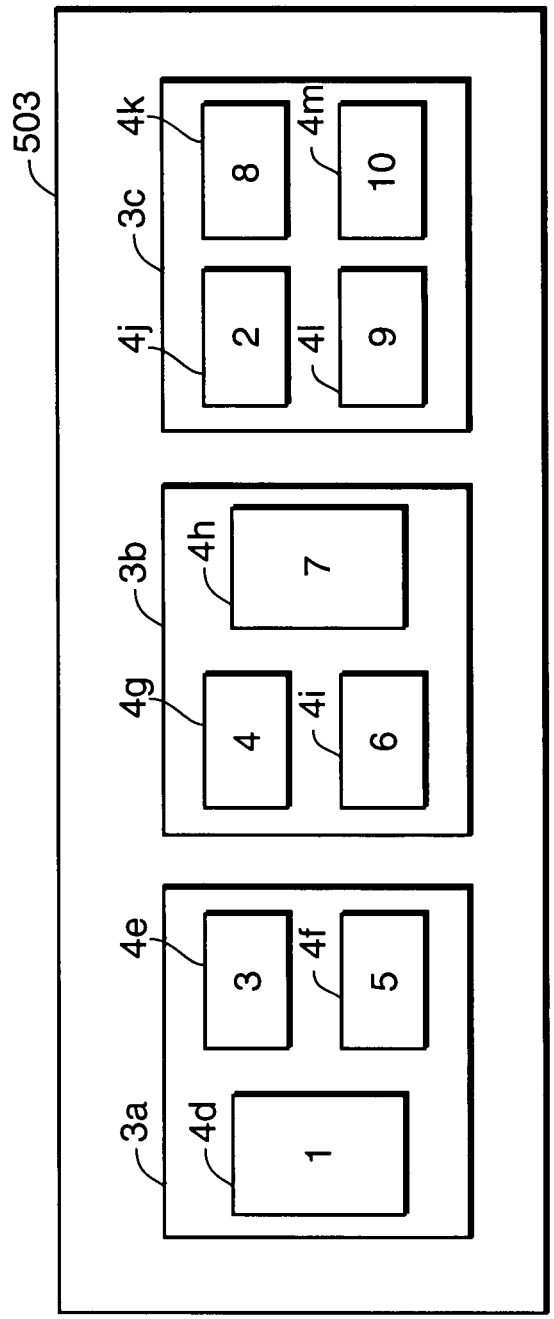
FIG. 11 is a view schematically showing an example of the integration pattern according to the integration settings of plural integrated document images across plural sheet images.

It should be noted that FIG. 11 conceptually shows a state where the sheet images 3a through 3c (integrated document images 4d through 4m) are displayed entirely in the integration pattern image display region P (the center portion C) on the display device 503 (in practice, not only the sheet images 3a through 3c, but also various button groups and the like are displayed in the display regions R, L, and U as in FIG. 9). Hereinafter, assume that all the sheet images (integrated document images) are displayed in the integration pattern image display region P on the display device 503 in FIG. 12 and FIG. 13 in the same manner as above.

Figure 10:
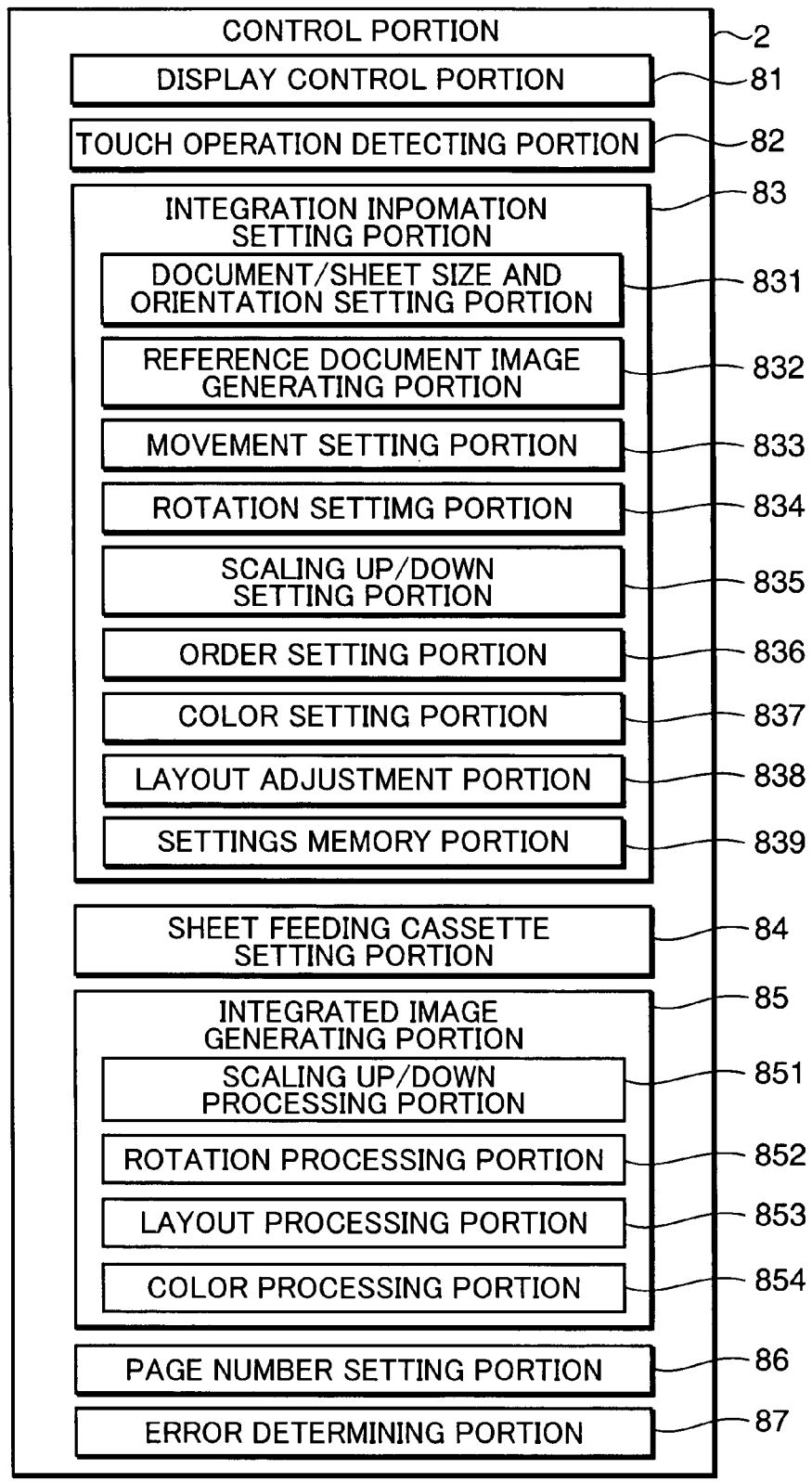
FIG. 10 is a block diagram of the control portion used to describe the integration settings of plural integrated document images across plural sheet images.

In a case where integration as shown in FIG. 11 is performed, for example, as is shown in FIG. 9 and FIG. 10, an input button group and respective function portions for performing an integration settings operation across plural sheet images 3 may be provided in addition to the configurations shown in FIGS. 3, 4, and 5. Referring to FIG. 9 first, the integration setting screen G2 includes a page number input button 61, a next page button 62, a previous page button 63, an entire view button 64, an automatic numbering button 65, a same pattern button 66, and a finalize button 67.

The page number input button 61 is a button for inputting an instruction to input the page number of documents the user wishes be read and integrated. After the user depresses the page number input button 61, he or she inputs the corresponding numeral, such as 10, from the numeric keypad 502. The page number information may be displayed on the screen to be visually confirmed by the user (10 PAGES is displayed in FIG. 9).

The next page button 62 is a button for inputting an instruction to successively display plural sheet images 3, for example, when the first sheet image 3a is displayed on the integration setting screen G2 (G1), it is used to display the sheet image 3b following the sheet image 3a. For example, assume that the sheet image 3a is currently displayed in FIG. 11, then displays are successively switched to the following sheet image 3b, sheet image 3c, and so on each time the user depresses the next page button 62.

The previous page button 63 (back button) is used to display the sheet image 3 (page) preceding the sheet image 3 currently displayed, to be more specific, assume that the sheet image 3b is currently displayed, the display is switched to the sheet image 3a as the user depresses the previous page button 63. Page information may be displayed on the integration setting screen to enable the user to visually confirm at which page of the sheet images 3 is currently displayed.

It is preferable to display the next page button 62 and the previous page button 63 (or the entire view button 64) at positions at which the user is able to make an operation intuitively with ease while looking the integration pattern image 5, for example, at the center portion C in the integration setting screen G2 (G1) (positions in the vicinity of the top or bottom of the integration pattern image 5).

The entire view button 64 is a button for inputting an instruction to display the overall setting state, for example, as shown in FIG. 11, that is, to display all the sheet images 3a through 3c in the same integration setting screen simultaneously after the integration settings for all the plural sheet images 3 are completed (or during the integration settings across plural sheet images 3). It should be noted, however, that the sheet images 3*a* through 3*c* are scaled down in this case so that all fall within the screen. The integration pattern by all the integrated document images 4 for all the sheet images 3*a* through 3*c* is referred to as the entire integration pattern.

Accordingly, all the integrated document images 4 that are integrated across the corresponding sheet images 3 (an entire integration pattern image when three integration pattern images 5 corresponding to the respective sheet images 3*a* through 3*c* are concerned collectively: the entire integration pattern image) are displayed collectively in the form of so-called a preview image. The user is thus able to understand easily the entire image of the integration settings, that is, to confirm whether the contents of the integration settings are acceptable before the print operation is actually started.

Figure 12:
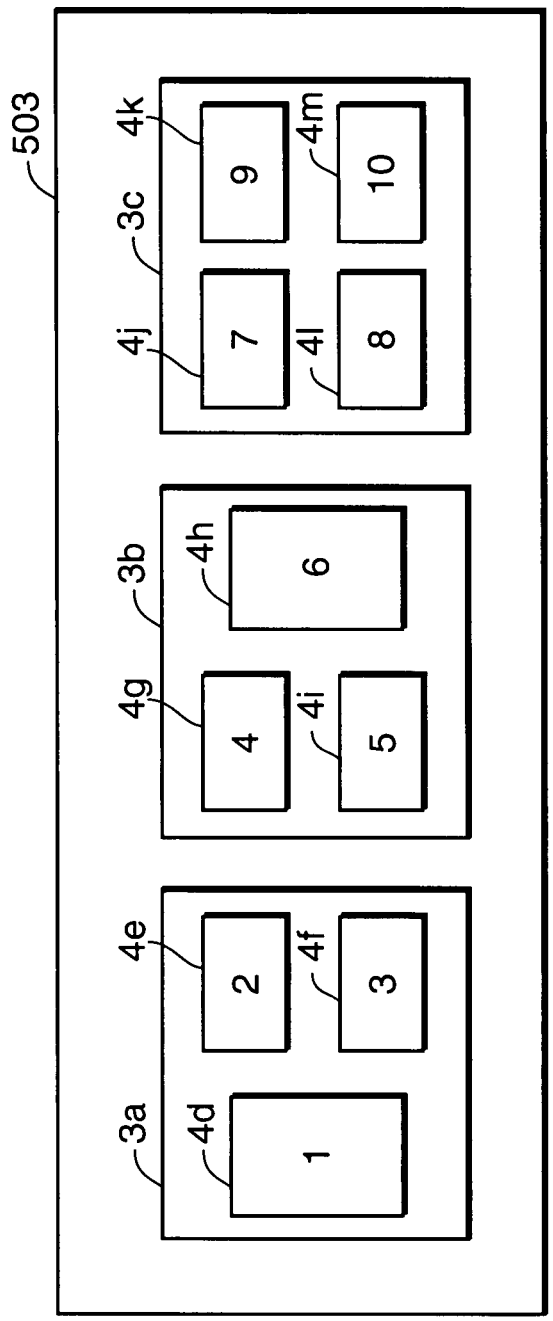
FIG. 12 is a view schematically showing another example of the integration pattern according to the integration settings of plural integrated document images across plural sheet images.

As will be described below with reference to FIG. 12, the automatic numbering button 65 is a button for inputting an instruction to automatically set the alignment sequence of the respective integrated document images 4 (to automatically perform numbering) for the corresponding sheet images 3 according to specific numbering criteria.

The same pattern button 66 is a button for inputting an instruction to set the respective sheet images 3 to the same integration pattern or to generate the sheet images 3 and the integrated document images 4 in the same integration pattern.

The finalize button 67 is a button for inputting an instruction to finalize the settings after the integration settings of all the integrated document images 4 across all the sheet images 3 are completed (before the user moves to an actual print operation). However, it maybe configured in such a manner that the finalization is cancelled (integration settings can be made) by, for example, depressing the cancel button 27.

In this modification, it may be configured to provide a page number setting portion 86 and an error determining portion 87 as is shown in FIG. 10 in addition to the respective function portions 81 through 85 shown in FIG. 5. The page number setting portion 86 sets information about the page number of documents upon receipt of the instruction input by the page number input button 61 and the input information from the numeric keypad 502.

The error determining portion 87 determines an error, that is, an erroneous operation or an erroneous setting, during the integration settings across plural sheet images 3, and performs an operation to notify the user of such error information. Upon determination of an error, the error determining portion 87 displays the error information where the user readily visually confirms the information, for example, a region indicated by a capital H in the integration setting screen G2 (G1) described below.

Switching of displays among the sheet images 3 (respective sheet images 3 including the integrated document images 4: the respective integration pattern images 5) by the next page button 62 and the previous page button 63, a display of the entire integration pattern image by the entire view button 64 (display of the notifying information, the page number of documents or which page is currently displayed), and the like are controlled, for example, by the display control portion 81. Also, the processing to perform automatic numbering by the automatic numbering button 65 is performed, for example, by the order setting portion 836.

An example of the actual procedure when ten document images are integrated into three sheet images will now be described. Initially, after the user inputs the page number of documents, for example, 10, using the page number input button 61 (numeric keypad 502), he or she generates a specific number of integrated document images, for example, three integrated document images 4*d* through 4*f*, for the sheet image 3*a* via dragging or the like in the same manner as the embodiment above, and makes various integration settings (settings as to rotation, scaling up/down, order, color, layout adjustment, and so forth) for these integrated document images 4*d* through 4*f*.

In order to make the various integration settings, as with the case described above (for example, see FIG. 7A and FIG. 7B), the user may move, rotate, and scale up or down the respective integration document images 4 by a dragging operation. The user may depress the confirm button 28 when the integration settings with the sheet image 3*a* end. In this instance, the page number setting portion 86 detects that three pages are subtracted from ten pages and the integration settings are necessary for the remaining seven pages of documents (integrated document images), or the integration settings have been performed for three out of ten integrated document images 4.

When the order of the respective integrated document images are set, for example, the user touches the order button 23 first for the integrated document image 4*d* and number information from 1 to 10 corresponding to a total page number of pages (ten pages) is displayed as alternatives in the instruction input image 211. The user then chooses a desired number from these numerals. All the numerals (2 to 10) other than the numeral (herein, 1) chosen first are displayed, for example, for the next integrated document image 4*e*, and the user chooses one of the displayed numerals. All the numerals other than the numerals (1 and 3) chosen for the integrated document images 4*d* and 4*e* are displayed for the next integrated document image 4*f*, and the user further chooses one of the displayed numerals. The order is set in this manner.

Subsequently, the user depresses the next page button 62 to display the sheet image 3*b* on the integration setting screen (makes a switch from the sheet image 3*a* to the sheet image 3*b*). In this instance, the sheet image 3*b* may be displayed in the same sheet size and orientation as those of the sheet image 3*a* of the previous page as default. The user generates a specific number of integrated document images, for example, three integrated document images 4*g* through 4*i*, for the sheet image 3*b* in the same manner as above, and makes various integration settings for these integrated document images 4*g* through 4*i*. In this case, too, numerals other than the numerals 1, 3, and 5 (numerals chosen for the sheet image 3*a*) are displayed for the integrated document image 4*g* and the user chooses one of these numerals, so that the order is set in the same manner as above. In addition, the page number setting portion 86 detects that the integration settings are necessary for the remaining four pages of integrated document images.

The user may depress the confirm button 28 after the integration settings for the sheet image 3*b* are completed in the same manner as above (the user may depress the confirm button 28 for the next sheet image 3*c*, too). When the confirm button 28 is depressed, the integration settings information (integration pattern image information) is temporarily stored in the settings memory portion 839. That is to say, when the user depresses the confirm button 28 after he changes the contents of the integration settings, updated information is stored.

Further, the user depresses the next page button 62 to display the sheet image 3*c* on the integration setting screen in the same manner as above. The user then generates a specific number of integrated document images, for example, four integrated document images 4*j* through 4*m*, for the sheet image 3*c*, and makes various integration settings for these integrated document images 4*j* through 4*m*. As the user depresses the finalize button 67, the entire settings, that is, the integration settings of all the ten document images (integrated document images 4) for the sheet images 3*a* through 3*c* are confirmed.

In the description above, the sheet image 3*b* when the user depresses the next page button 62 after the integration settings for the sheet image 3*a* are completed is in so-called a blank state where no integrated document images 4 are generated. The invention, however, is not limited to this configuration, and integrated document images 4 in the same integration settings state as that of the integrated document images 4*d* through 4*f* in the sheet image 3*a* may be displayed together with the sheet image 3*b*, that is, the setting state (integration pattern image 5) of the sheet image 3 and the integrated document images 4 same as that of the previous page may be displayed by means of copying so to speak. In this case, the integration settings information (integration pattern image information) of the previous page is stored, for example, in the settings memory portion 839.

In the description above, the sheet image 3*b* displayed by depressing the next page button 62 after the integration settings for the sheet image 3*a* (3*b*) are completed is displayed in the same size and orientation as those of the sheet image 3*a* (3*c*). It goes without saying, however, that the sheet size and orientation can be changed using the sheet settings button group 40 after being displayed. To be more specific, it is possible to set the sheet image 3*a* to the A4 size, the sheet image 3*b* to the B5 size, and the sheet image 3*c* to the A3 size, so that each is of a different size. The method of cancelling during various settings is the same as the method adopted in the embodiment above. Also, it goes without saying that the integration settings information of the respective integrated document images 4 across plural sheet images 3 can be saved using the settings saves button 29.

The method of making the integration settings of plural integrated document images 4 across plural sheet images 3 is not limited to the method described above, by which the integration settings are made for the sheet images 3 sequentially one by one, more specifically, only after the integration settings for a given sheet image 3 are completed, the integration settings for the next sheet image 3 are started, and a method of making the settings across all the sheet images 3 simultaneously (collectively at a time) so to speak may be applicable.

In this case, for example, a necessary number of sheet images 3 like the one shown in the integration pattern image 5 in FIG. 3 (sheet images 3 each having thereon a specific number of reference document images) are prepared according to the number of integrated original documents, that is, the page number of documents. More specifically, in a case where the page number of documents is 10, three sheet images 3*a*, 3*b*, and 3*c* are prepared (generated in advance), to which three, three, and four reference document images are allocated, respectively, as is shown in FIG. 11. In this instance, the user depresses the confirm button 45 for the respective sheet images 3 to tentatively complete the integration settings for the respective sheet images 3.

In other words, after the user generates three button document images for the sheet image 3*a* via dragging, he or she depresses the confirm button 45. The user then depresses the next page button 62 to display the next sheet image 3*b*, and generates three button document images via dragging, after which he or she depresses the confirm button 45. The user further depresses the next page button 62 to display the next sheet image 3*c*, and generates four button document images via dragging, after which he or she depresses the confirm button 45.

The method, however, is not limited to this method, and the user may first prepare as many (three, herein) sheet images 3 as necessary in which no button document images are generated via dragging, and the user generates (allocates) the button document images later. When preparing plural sheet images 3 in which reference document images are also generated as described above, the user may depress the same pattern button 66 to make a copy (duplication) so to speak by generating those same as in a given sheet image 3 (in the same integration pattern).

For the respective sheet images 3 in which button document images (reference document images) are generated, the user makes the various integration settings of the respective reference document images (integrated document images 4) while moving in and out these sheet images 3 using the next page button 62 and the previous page button 63.

In this case, for the settings of the order, in particular, the order of all the integrated document images 4 (herein, 1 to 10) can be determined by repetitively performing the setting operation, by which the user first chooses one integrated document image 4 by touching it and touches the order button 23 for this choice to choose a desired order (number) from the instruction input image 211 on which numerals from 1 to 10 are displayed as alternatives in the same manner as above.

In other words, the user may set the order of an arbitrary integrated document image 4 for an arbitrary sheet image 3 in such a manner that while the user displays three sheet images 3*a* through 3*c* by switching from one to another, he or she may set, for example, 1 to the integrated document image 4*d* and 3 to the integrated document image 4*e* in the sheet image 3*a* as is shown in FIG. 11 and display the sheet image 3*c* by depressing the next page button 62 twice, and then the user may set, for example, 2, 8, 9 and 10 in the same manner as above and return to the previous page to set 4 in the sheet image 3*b*, after which the user may set 5 in the sheet image 3*a* and display the sheet image 3*b* again to set 7.

The method of setting the order, however, is not limited to this method, and it is possible to adopt a method by which after the user depresses the order button 23 as described above, the user touches all the integrated document images 4*d* through 4*m* in the order he or she desires, so that the order is set in the order in which the user touches them.

As has been described, the order may be set one by one manually so to speak, or automatically by depressing the automatic numbering button 65. In the latter case, it may be configured in such a manner that, for example, when the user depresses the automatic numbering button 65, numerals 1 to 10 are automatically allocated to all the integrated document images 4*d* through 4*m* across the sheet images 3*a* through 3*c* as is shown, for example, in FIG. 12 according to a specific numbering rule (numbering information) from the integrated document image 4 at the top. In the case of FIG. 12, the numbering rule is a rule relating to the priority determination such that a priority is given first to integrated document images 4 on the left position in the image sheet 3, and then a priority is given to integrate document images 4 on the upper row.

The numbering rule, however, is not limited to this rule, and for example, it is possible to adopt arbitrary rules according to which a priority is given first to those on the upper row and then those on the right side, the numbers are allocated reversely in an ascending order from 10 to 1, or the numbers are allocated clockwise by setting the origin at a given point within the sheet image 3.

The automatic numbering processing is performed by the order setting portion 836 according to the numbering rule pre-stored therein. It may be configured in such a manner that the user sets the numbering rule arbitrarily each time the number settings are made (for example, alternatives are displayed in the instruction input image 211 to enable the user to choose one of alternatives).

The automatic numbering may be performed for the sheet images 3 one by one instead of being performed for all the sheet images 3. To be more specific, it may be configured in such a manner that automatic numbering is performed according to the numbering rules that differ from one sheet image 3 to another, that is, all the integrated document images 4 in a given sheet image 3 may be automatically numbered according to a first numbering rule, and all the integrated document images 4 in the next sheet image 3 are automatically numbered according to a second numbering rule different from the first numbering rule.

Herein, the numbering has been described in a case where the settings are made across all the sheet images 3 simultaneously. It should be appreciated, however, that the same applies to the other integration settings, i.e. rotation, scaling up/down, color, layout adjustment, and so forth. In the other integration settings, the integration settings may not be performed for the respective integrated document images 4 one by one, and it may be performed for all the integrated document images 4 simultaneously.

More specifically, for example, all the integrated document images 4 across three sheet images 3 may be specified at a time by depressing, for example, the all specify button 26 so as to rotate, scale up or down, and specify color printing for these integrated document images 4 simultaneously. The user makes the integration settings of the respective integrated document images 4 for the respective sheet images 3 by moving in and out the respective pages at will as described above, and depresses the finalize button 67 when the integration settings are completed. When the user depresses the entire view button 64 later, he or she is able to confirm the integration settings state in all the sheet images 3.

Figure 13:
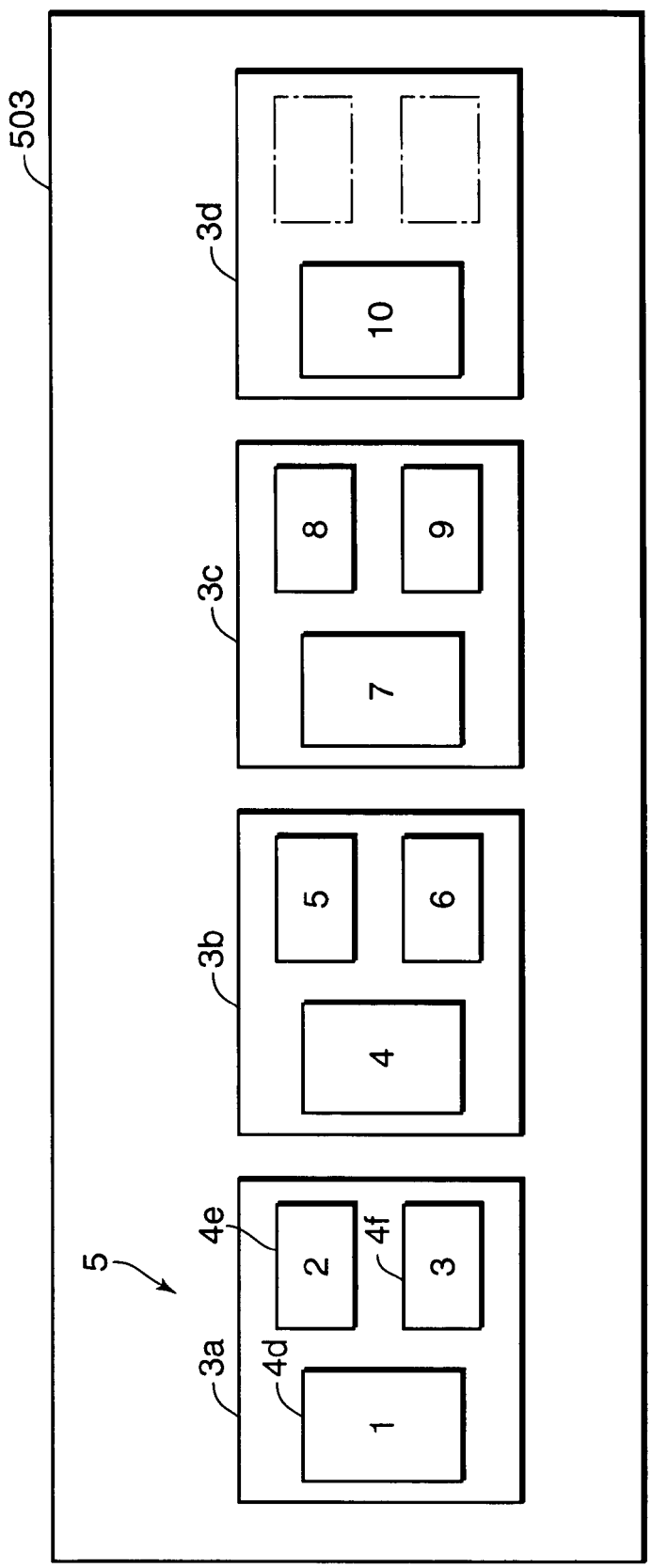
FIG. 13 is a view schematically showing still another example of the integration pattern according to the integration settings of plural integrated document images across plural sheet images.
Figure 14A:
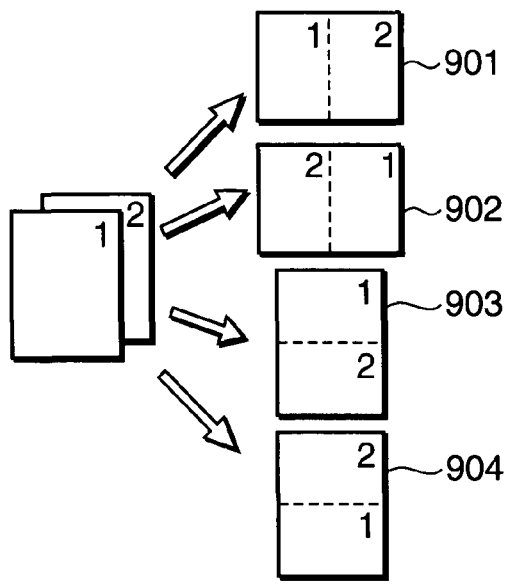
FIG. 14A is a view schematically showing a conventional integration pattern.
Figure 14B:
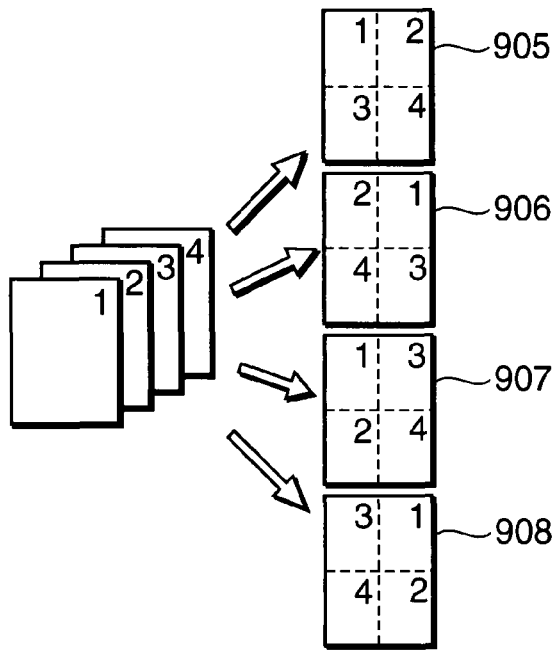
FIG. 14B is a view schematically showing another conventional integration pattern.

In order to generate the sheet images 3 and the integrated document images 4, the user may generate those same as those in the integration pattern image 5 currently displayed on the integration setting screen using the same pattern button 66. More specifically, as is shown in FIG. 13, the user first completes the integration settings of the respective integrated document images 4 for the sheet image 3a (the numbering has not been performed in this instance), and he or she may make copies as the sheet images 3b, 3c, and so on having the integration pattern same as that of the sheet image 3a by depressing the same button pattern 66.

When such copying is performed, the page number of documents is reflected. More specifically, the page number used each time copying is performed is counted in the page number setting portion 86, and the remaining integrated document image(s) 4 (herein, one integration document image 4 at the tenth page) is displayed in the last sheet image 3d. The numbering is performed for these sheet images 3a through 3d in the same manner as above. In addition, in order to make a copy, information about the integration pattern (integration image pattern 5) used as the original of copies is stored, for example, in the settings memory portion 839, and copying processing (integration setting processing) is performed by the integration information setting portion 83 and the integrated image generating portion 85. It may be configured in such a manner that the copying processing and the numbering processing are performed simultaneously by depressing the automatic numbering button 65 following the depressing of the same pattern button 66 (the result is shown in FIG. 13).

In addition, it may be configured in such a manner that in a case where the user makes an erroneous operation or an erroneous setting during the integration settings, the user is notified of specific error information.

More specifically, for example, the page number of documents is 10 and the user depresses the finalize button 67 when the integration settings have been completed, for example, for only six integrated document images 4 (for example, the integration settings have been completed for the sheet images 3a and 3b shown in FIG. 11, and the integration settings have to be made for the remaining four integrated document images 4), or the user depresses the next page button 62 to generate a new sheet image 3 when the integration settings have been completed for all the ten integrated document images 4 with the sheet images 3a through 3c, specific error information, for example, an error message (texts, marks, or pictures), "integration settings have not been completed for all documents (or integration settings have been completed for all documents)", may be displayed, for example, in the region indicted by a capital H in the integration setting screen (G2). It goes without saying that the error information is notified by a specific sound. In short, any method can be used as long as the user is notified of the error.

Further, the configuration to integrate plural integrated document images 4 across plural sheet images 3 can be rephrased as follows. That is, the integration information setting portion 83 is formed to be capable of determining a first integration pattern and a second integration pattern different from the first integration pattern as the integration pattern for plural integrated document images 4. It may be configured in such a manner that an integrated printing operation is performed by printing respective integrated document images 4 in the first integration pattern on a specific number of sheets (a first sheet or sheet group: one ore more than one first sheet) in the first integration pattern, and by printing respective integrated document images 4 in the second integration pattern on a specific number of sheets (a second sheet or sheet group: one or more than one second sheet) in the second integration pattern.

As has been described, according to the copying machine 1 (image forming apparatus) of this embodiment, document images are acquired by the document reading portion 300 (document image acquiring portion). By making settings relating to integration (integration settings) for integrated document images 4 one by one (for example, integrated document images 4a through 4c) in the integration information setting portion 83 (integration pattern determining portion), it is possible to determine the integration pattern of the integrated document images 4 for a sheet.

In addition, integrated document images 4 corresponding to the integration pattern are generated from the document images acquired by the document reading portion 300 by the integration image generating portion 85 (integrated document image generating portion) according to the integration pattern determined by the integration information setting portion 83. The integrated document images 4 (integrated images made of plural integrated document images 4) generated by the integrated image generating portion 85 are then printed (images are formed) on the sheet in the integration pattern by the image forming portion 100 (print portion).

As has been described, by making the integration settings for each integrated document image 4, the integration pattern of the integrated document images 4 for the sheet is determined. More specifically, because the integration settings are made for each integrated document image 4, the user is able to make the integration pattern by these integrated document images 4 as an integration pattern he or she desires. The integrated document images 4 corresponding to the integration pattern are generated from the document images according to the integration pattern thus set, and the integrated document images 4 are printed on the sheet in this integrated pattern. The user is thus able to make an integrated copy in the integration pattern he or she desires.

In addition, the integrated document images 4 and the sheet image 3 representing the sheet are displayed by the display device 503 (display portion) on the integration setting screen G1 (G2) on which the integration settings are made. The integration pattern is determined by making the settings as to movement, rotation, and scaling up/down of the respective integrated document images 4 for the sheet image 3 by the integration information setting portion 83 in response to an operation instruction input by the user on the integration setting screen, and by setting the alignment sequence of the document images for the respective integrated document images 4.

As has been described, because the integration pattern is determined by making the settings as to movement, rotation, and scaling up/down of the respective integrated document images 4 for the sheet image 3 in response to an operation instruction input by the user on the integration setting screen displayed on the display device 503, and by setting the alignment sequence of the document images for the respective integrated document images 4, it becomes easier for the user to set an integration pattern as he or she desires.

Also, the size and the orientation of the sheet are set by the sheet setting function (recording sheet setting function) furnished to the integration information setting portion 83, and of the size and the orientation of the sheet set by the sheet setting function, the sheet image 3 reflecting at least the orientation is displayed together with the integrated document images 4 by the display device 503. In this manner, because the sheet image 3 reflecting the orientation of the sheet is displayed together with the integrated document images 4, the user becomes able to make the integration settings of the integrated document images 4 for the sheet image 3 intuitively and more easily by taking the orientation of the sheet into account.

Also, at least one of the movement, rotation, and scaling up or down processing of the respective integrated document images 4 is performed in response to an instruction input by a dragging operation by the user on the integration setting screen by the drag processing function furnished to the integration information setting portion 83. As has been described, because the user is able to perform at least one of the movement, rotation, and scaling up or down processing of the respective integrated document images 4 by a drag operation, the user is able to set an integration pattern as he or she desires more easily.

Also, the settings as to whether the respective integrated document images 4 are printed in color are made in response to an operation instruction input by the user on the integration setting screen by the color setting function furnished to the integration information setting portion 83. As has been described, because the settings as to whether the integrated document images 4 are printed in color are set, the user is able to set an integration pattern including the settings as to whether color printing (or monochrome printing) is executed or not, which in turn enables the user to set the integration pattern at a higher degree of flexibility.

Also, because the layout of the respective integrated document images 4 for the sheet image 3 is adjusted automatically in response to an operation instruction input by the user on the integration setting screen by the layout adjustment function furnished to the integration information setting portion 83, the user becomes able to set an integration pattern as he or she desires more easily in a reliable manner.

Also, because the first integration pattern for a first recording sheet or recording sheet group and the second integration pattern different from the first integration pattern for a second recording sheet or recording sheet group are set as the integration pattern by the integration information setting portion 83, not only is it possible to make the integration settings for plural integration document images in different integration patterns by selectively determining the first integration pattern or the second integration pattern, but it is also possible to print the respective integrated document images in the first integration pattern or in the second integration pattern according to the integration settings on a specific number of recording sheets (a single recording sheet or more than one recording sheet: a recording sheet group).

Also, the page number of plural document images is set by the page number setting portion 86, and the entire integration pattern, which is an integration pattern of plural integrated document images 4 (for example, the integrated document images 4*d* through 4*m*) for plural sheet images 3 (for example, the sheet images 3*a* through 3*c*), is determined by the integration information setting portion 83 according to the information about the page number thus set and an operation instruction input by the user on the integration setting screen. Accordingly, integrated document images 4 (integrated images made of plural integrated document images 4) corresponding to the entire integration pattern are generated from the document images acquired by the document reading portion 300 by the integration image generating portion 85 according to the entire integration pattern.

As has been described, because the entire integration pattern, which is an integration pattern of plural integrated document images 4 for plural sheet images 3, is determined according to the information about the page number that has been set and an operation instruction input by the user on the setting screen, the user is able to make the integration settings of plural integrated document images 4 over plural sheet images 3. In short, the user is able to integrate plural integrated document images 4 in an entire integration pattern as he or she desires.

In addition, because the integrated document images 4 corresponding to the entire integration pattern are generated from the document images according to the entire integration pattern thus set, it is possible to print the integrated document images 4 corresponding to the entire integration pattern thus generated on a sheet. In short, the user is able to make an integrated copy in the entire integration pattern he or she desires.

Because the switching portion (the next page button 62, the previous page button 63, and the display control portion 81) that displays plural sheet images 3 each including specific numbers of integrated document images 4 on the integration setting screen by switching one sheet image 3 to another is provided, the user is able to set an entire integration pattern as he or she desires more easily using this switching portion to move in and out the respective sheet images 3 (for example, the sheet images 3*a* through 3*c*) at will while switching displays of the respective sheet images 3 (each including a specific number of integrated document images 4).

In addition, the user is able to make the integration settings of plural integrated document images 4 across plural sheet images 3 collectively at a time so to speak. More specifically, there is no need to make the settings sequentially from the sheet image 3 at the top by making the integration settings of integrated document images 4 for a given sheet image 3 only after the integration settings of plural document images 4 for the preceding sheet image 3 are completed (the degree of flexibility in integration settings is increased).

Also, an integration pattern of integrated document images 4 for a given sheet image 3 among plural sheet images 3 (for example, the integration pattern of the integrated document images 4d through 4f for the sheet image 3a) is stored in the settings memory portion 839 (memory portion), and the integrated document images 4 and the sheet image 3 in an integration pattern same as the integration pattern stored in the settings memory portion 839 (for example, the sheet image 3b and the corresponding integrated document images 4d through 4f; see FIG. 13) are displayed on the integration setting screen by the display device 503 (the display control portion 81, the same pattern button 66) (display portion). More specifically, because the user is able to display integrated document images 4 and the sheet image 3 having the same integration pattern on the integration setting screen by means of duplication (copying), it is possible to eliminate the time and labor to generate (display) integrated document images 4 and a sheet image 3 having an integration pattern same as the one already generated by repeating the same operation from the start so to speak. The user thus becomes able to make the integration settings of plural integrated document images 4 across plural sheet images 3 more easily.

Also, because the numbering of respective integrated document images 4 for plural sheet images 3 is performed automatically in response to an operation instruction input by the user on the integration setting screen by the numbering function (the order setting portion 836, the automatic numbering button 65) furnished to the integration information setting portion 83, the user is able to set an entire integration pattern as he or she desires more easily.

The invention can be configured as follows.

(A) The embodiment above is configured in such a manner that the user makes an instruction input on the integration setting screen with his or her finger (touching operation). However, it may be configured in such a manner that an instruction input is made with the use of, for example, a pen (pointing stylus). In short, any means capable of touching the screen is adoptable.

Figure 7A:
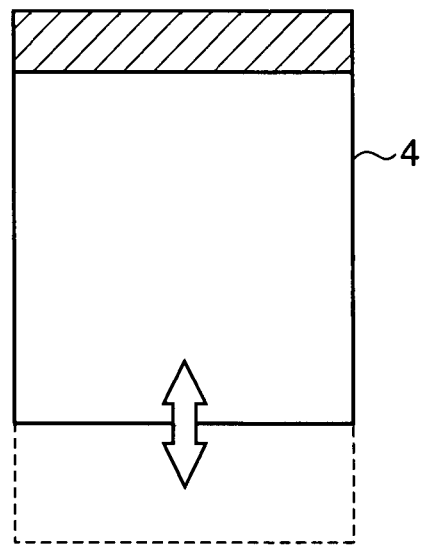
FIG. 7A is a view used to describe a modification relating to scaling up or down of an integrated document image when the integrated document image is scaled up or down lengthwise or crosswise.
Figure 7B:
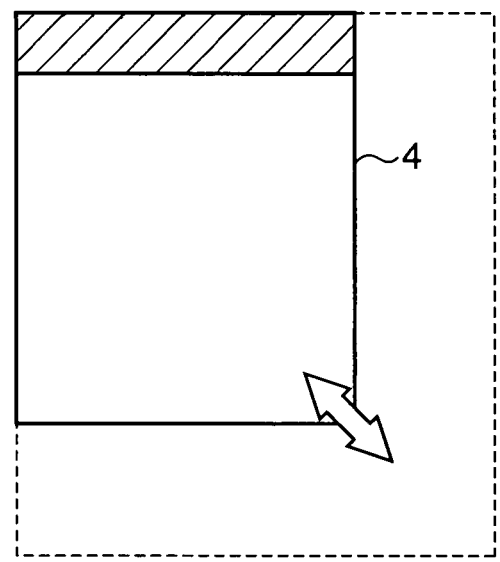
FIG. 7B is a view used to describe another modification relating to scaling up or down of an integrated document image when the integrated document image is scaled up or down diagonally.

(B) The embodiment above is configured in such a manner that scaling up or down of integrated document images 4 by the scaling up/down setting portion 835 is performed by the scale up/down button 22, that in, an input by the button. However, scaling up/down may be performed by dragging the integrated document images 4 at a specific point. In this case, for example, as is shown in FIG. 7A, it may be configured in such a manner that the integrated document image 4 is partially scaled up or down lengthwise or crosswise as the user touches the end side with his or her finger or the pen and drags the end side directly. Alternatively, as is shown in FIG. 7B, it may be configured in such a manner that the integrated document image 4 is scaled up or down diagonally, that is, entirely, as the user touches the corner of the integrated document image 4 with his or her finger or the pen and drags the corner directly.

Figure 8:
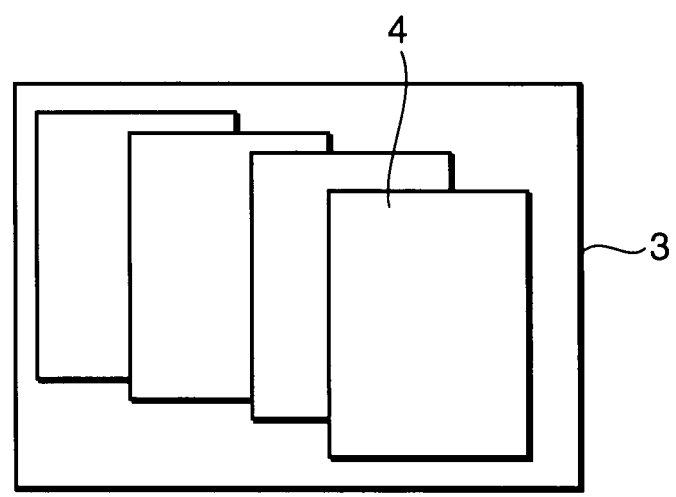
FIG. 8 is a view schematically showing a modification of an integration pattern.

(C) The integration pattern is not limited to those shown in FIG. 4, and for example, the integrated document images 4 may overlap one on top of another as is shown in FIG. 8. The overlapping order may be an inverse order of the one shown in the drawing so that the integrated document image 4 on the left is at the uppermost (forefront) position. In addition, all the integrated document images 4 do not necessarily overlap one on top of another, and an integration pattern in which a part of them overlap one on top of another is adoptable. In this manner, the integration pattern (layout) can be changed arbitrarily.

(D) In the embodiment above, the reference document image is generated by the reference document image generating portion 832 by dragging the generation button 38 into the integration pattern image display region P. The generation method is not limited to this method, and for example, it may be configured in such a manner that the reference document image is generated (displayed) at a specific position within the integration pattern image display region P as the user depresses the generation button 38 (touches it only once). Herein, as many reference document images as the number of depressing of the generation button 38 are generated. In this case, it is preferable to display the reference document images at positions displaced from one another within the integration pattern image display region P, so that the user can know how many reference document images have been generated.

(E) In the embedment above, the integrated document images 4 are moved by rotation by the rotation setting portion 834 by inputting an instruction using the rotate button 21 (instruction input image 211). This movement by rotation may be made by a drag operation. In this case, the user touches one end side (or the center) of the integrated document image 4 and drags this end side in a specific direction to be rotated by a specific angle of rotation in a touching state (moves his or her finger or the like by sliding on the screen). It may be configured in such a manner that when rotated by about 90° or 180° via dragging, the integrated document image 4 is automatically adjusted (attracted so to speak) to the position rotated by exactly 90° or 180°.

(F) It may be configured in such a manner that all the confirm buttons 28, 35, and 45 are omitted, that is, the finalization operation by the confirm button is not performed. In this case, the user can move to the next operation without having to perform the confirmation operation, that is, while the integration settings are saved.

(G) In the embodiment above, the user inputs the page number of document images using the page number input button 61 manually so as to speak. However, it may be configured in such a manner that the page number is inputted not manually but automatically, that is, the page number setting portion 86 counts the documents that have been fed while the documents are fed by the document feeding portion 200.

(H) It may be configured in such a manner that the layout of respective integrated document images 4 across plural sheet images 3 is adjusted automatically by the layout adjustment portion 838. In this case, for example, the layout may be adjusted in the same manner for each sheet image 3 as is shown in FIG. 6A or FIG. 6B, or the layout may be adjusted differently from one sheet image 3 to another.

(I) The embodiment above is configured in such a manner that the integration setting is made in the copying machine 1. However, it may be configured in such a manner that the integration setting is made in a given processing portion outside the copying machine 1. Specifically, the integration setting may be made in an information processing apparatus (external apparatus), such as a PC (Personal Computer) and a PDA (Personal Digital Assistant), connected thereto via a network, such as an LAN (Local Area Network), or configured to able to transfer information by the use of storage media, such as memory card, by the way of an USB (Universal Serial Bus).

In this case, for example, the monitor of an PC is displayed with an integration setting screen similar to the integration setting screen G1 or G2 (see FIGS. 3, 4, and 9) to make integration settings. The user makes integration settings for integration document images 4 for sheet images 3 by operating a mouse-pointer to drag or click a specified portion (e.g., the generation button 38) in place of dragging or touching by his finger. For example, as shown in FIG. 4, integration settings are sequentially made for sheet images 3, or alternatively as shown in FIGS. 9, 11 to 13, integration settings are simultaneously made for all the sheet images 3. However, it should be noted that this integration setting on the PC is made to determine information (integration pattern information, or Form) concerning how to integrate, but the integration document images 4 (integration pattern images 5) are not really generated by reducing or enlarging document images. In other words, the document image or the integration document image 4 displayed on the PC monitor is a virtual or mimic image generated on the PC.

The integration setting information (determined integration pattern information) obtained by making the integration settings on the PC in the above-mentioned way is transferred (taken and stored) to the copying machine 1 via the LAN or the storage media. In the copying machine 1, document images acquired by reading documents on the document reading unit 300 are enlarged, reduced, rotated, or moved according to the received integration setting information to thereby generate integration document images 4 (integration pattern image 5) actually. The generated integration document images are printed in color or monochrome to a sheet (recording sheet) in the integration pattern by the image forming portion 100. In other words, the PC executes control of allowing the copying machine 1 to acquire the document images, and to perform the printing according to the integration pattern generated by the PC.

In this variation, the PC does not actually handle the document images but determines only the integration pattern. However, it may be possible that document images prepared and stored in the PC in advance or taken in the PC from the copying machine 1 via the LAN are handled (enlarged or reduced) on the PC to generate integration pattern information having information concerning the integration document images 4 (integration pattern image 5). Thereafter, in the similar way, the integration pattern information including the information concerning the integration document images generated on the PC is taken in the copying machine 1, which executes then the printing to sheets stored in the sheet feeding cassettes 401, 402.

As has been described above, an image forming apparatus of the invention includes: a document image acquiring portion that acquires a document image; an integration pattern determining portion that makes settings relating to integration for each integrated document image when plural document images are integrated into a recording sheet as integrated document images and thereby determines an integration pattern of the integrated document images for the recording sheet; an integrated document image generating portion that generates the integrated document images corresponding to the integration pattern from the document images acquired by the document image acquiring portion according to the integration pattern determined by the integration pattern determining portion; and a print portion that prints the integrated document images generated by the integrated document generating portion onto the recording sheet in the integration pattern.

According to this configuration, document images are acquired by the document image acquiring portion. The integration pattern of the integrated document images for a recording sheet is determined as the integration pattern determining portion makes the settings relating to the integration for each integrated document image. Also, the integrated document image generating portion generates integrated document images corresponding to the integration pattern from the document images acquired by the document image acquiring portion according to the integration pattern determined by the integration pattern determining portion. The print portion prints the integrated document images generated by the integrated document image generating portion on a recording sheet in the integration pattern.

As has been described, because the integration pattern of the integrated document images for a recording sheet is determined, that is, the integration settings are made for each integrated document image, by making the settings relating to the integration for each integrated document image, the user is able to make an integration pattern made by these integration document images to an integration pattern he or she desires. Also, the integrated document images corresponding to the integration pattern are generated from the document images according to the integration pattern thus set and the integrated document images are printed on the recording sheet in this integration pattern. The user is thus able to make an integrated copy in the integration pattern he or she desires.

Also, in the configuration described above, it is preferable that the apparatus further includes a display portion that displays a setting screen used to make settings relating to the integration of the integrated document images and a recording sheet image representing the recording sheet, and that the integration pattern determining portion makes settings as to movement, rotation, and scaling up or down of the respective integrated document images for the recording sheet image in response to an operation instruction input by a user on the setting screen, and determines the integration pattern by setting an alignment sequence of the document images for the respective integrated document images.

According to this configuration, the display portion displays the integrated document images and the recording sheet image representing the recording sheet on the setting screen on which the settings relating to the integration are made. The integration pattern determining portion determines the integration pattern by making the settings as to movement, rotation, and scaling up/down for the respective integrated document images for the recording sheet image and by setting the alignment sequence of the document images for the respective integrated document images in response to an operation instruction input by the user on the setting screen.

As has been described, because the integration pattern is determined as the settings as to movement, rotation, and scaling up/down of the respective integrated document images for the recording sheet image are made and the alignment sequence of the document images for the respective integrated document images is set in response to an operation instruction input by the user on the setting screen displayed on the display portion, it becomes easier for the user to set an integration pattern as he or she desires.

Also, according to the configurations described above, it is preferable that the integration pattern determining portion is furnished with a recording sheet setting function of setting a size and an orientation of the recording sheet, and that the display portion displays the recording sheet image that reflects, of the size and the orientation of the recording sheet set by the recording sheet setting function, at least the orientation together with the integrated document images.

According to this configuration, the size and the orientation of the recording sheet are set by the recording sheet setting function furnished to the integration pattern determining portion, and of the size and the orientation of the recording sheet set by the recording sheet setting function, a recording sheet image reflecting at least the orientation is displayed together with the integrated document images by the display portion.

As has been described, because the recording sheet image reflecting the orientation of the recording sheet is displayed together with the integrated document images, the user is able to make the settings related to the integration of the integrated document images for the recording sheet image (integration settings) intuitively and more easily by taking the orientation of the recording sheet into account.

Also, in the configurations described above, it is preferable that the integration pattern determining portion is further furnished with a drag processing function of performing at least one of movement, rotation, and scaling up or down processing of the respective integrated document images in response to an instruction input by a dragging operation by the user on the setting screen.

According to this configuration, at least one of the movement, rotation, and scaling up or down processing for each integrated document image is performed by the drag processing function furnished to the integration pattern determining portion in response to an instruction input by the user's dragging operation on the setting screen.

As has been described, because at least one of the movement, rotation, and scaling up or down processing for each integrated document images is performed by a dragging operation, the user is able to set the integration pattern as he or she desires more easily.

Also, in the configurations described above, it is preferable that the integration pattern determining portion is further furnished with a color setting function of making settings as to whether the respective integrated document images are printed in color in response to an operation instruction input by the user on the setting screen.

According to this configuration, the settings as to whether the respective integrated document images are printed in color are made by the color setting function furnished to the integration pattern determining portion in response to an operation instruction input by the user on the setting screen.

As has been described, because the settings as to whether the integrated document images are printed in color are made, the user is able to set the integration pattern including the settings as to whether color printing (or monochrome printing) is executed or not, which in turn enables the user to set the integration pattern at a higher degree of flexibility.

Also, in the configurations described above, it is preferable that the integration pattern determining portion is further furnished with a layout adjusting function of automatically adjusting a layout of the respective integrated document images with respect to the recording sheet image in response to an operation instruction input by the user on the setting screen.

According to this configuration, the layout of the respective integrated document images with respect to the recording sheet image is automatically adjusted by the layout adjustment function furnished to the integration pattern determining portion in response to an operation instruction input by the user on the setting screen.

As has been described, because the layout of the respective integrated document images with respect to the recording sheet image is adjusted automatically, the user is able to set an integration pattern as he or she desires more easily in a reliable manner.

In the configurations described above, it is preferable that the integration pattern determining portion determines, as the integration pattern, a first integration pattern for one of a first recoding sheet and a first recoding sheet group and a second integration pattern different from the first integration pattern for one of a second recording sheet and a second recording sheet group.

According to this configuration, the integration pattern determining portion determines, as the integration pattern, the first integration pattern for the first recording sheet or recording sheet group and the second integration pattern different from the first integration pattern for the second recording sheet or recording sheet group.

As has been described, because the first integration pattern for the first recording sheet or recording sheet group and the second integration pattern different from the first integration pattern for the second recording sheet or recording sheet group are determined as the integration pattern by the integration pattern determining portion, not only is it possible to make the integration settings for plural integration document images in different integration patterns by selectively determining the first integration pattern or the second integration pattern, but it is also possible to print the respective integrated document images in the first integration pattern or in the second integration pattern according to the integration settings on a specific number of recording sheets (a single recording sheet or more than one recording sheet: a recording sheet group).

Also, in the configurations described above, it is preferable that the apparatus further includes a page number setting portion that sets the page number of the plural document images, and that the integration pattern determining portion determines an entire integration pattern, which is an integration pattern of plural integrated document images for plural recording sheet images, according to information about the page number that has been set and an operation instruction input by the user on the setting screen, and the integrated document image generating portion generates the integrated document images corresponding to the entire integration pattern from the document images acquired by the document image acquiring portion according to the entire integration pattern.

According to this configuration, the page number of plural document images is set by the page number setting potion, and the entire integration pattern, which is an integration pattern of plural integrated document images for plural recording sheet images, is determined by the integration pattern determining portion according to the information about the page number that has been set and an operation instruction input by the user on the setting screen. In addition, the integrated document images corresponding to the entire integration pattern are generated from the document images acquired by the document image acquiring portion by the integrated document generating portion according to the entire integration pattern.

As has been described, because the entire integration pattern, which is an integration pattern of plural integrated document images for plural recording sheet images, is determined according to the information about the page number that has been set and an operation instruction input by the user on the setting screen, the user is able to make the integration settings of plural integrated document images over plural recording sheet images. In short, the user is able to integrate plural integrated document images in an entire integration pattern he or she desires. In addition, because the integrated document images corresponding to the entire integration pattern are generated from the document images according to the entire integration pattern thus set, the user is able to print the integrated document images corresponding to the entire integration pattern thus generated on recording sheets, that is, he or she is able to make an integrated copy in the entire integration pattern he or she desires.

Also, in the configurations described above, it is preferable that the apparatus further includes a switching portion that displays the plural recording sheet images each including a specific number of the integrated document images on the setting screen by switching from one recording sheet image to another.

According to this configuration, plural recording sheet images each including a specific number of integrated document images are displayed on the setting screen while being switched one from another by the switching portion.

As has been described, because the apparatus includes the switching portion that displays plural recording sheet images each including a specific number of integrated document images on the setting screen while switching one recording sheet image to another, the user is able to set an entire integration pattern as he or she desires more easily while moving in and out the respective recording sheet images at will by displaying the respective recording sheet images (each including a specific number of integrated document images) while switching one recording sheet image to another using the switching portion. In addition, the user is able to make the integration settings of plural integrated document images across plural sheet images collectively at a time so to speak. More specifically, there is no need to make the settings sequentially from the recording sheet image at the top by making the integration settings of integrated document images for a given recording sheet image only after the integration settings of plural document images for the preceding recording sheet image are completed (the degree of flexibility in integration settings is increased).

Also, in the configurations described above, it is preferable that the apparatus further includes a memory portion that stores an integration pattern of integrated document images for one recording sheet image among the plural recording sheet images, and that the display portion displays integrated document images and a recording sheet image having an integration pattern same as the integration pattern stored in the memory portion on the setting screen.

According to this configuration, the integration pattern of integrated document images for one recording sheet image among plural recording sheet images is stored in the memory portion, and integrated document images and a recording sheet image having an integration pattern same as the integration pattern stored in the memory portion are displayed on the setting screen by the display portion.

As has been described, because integrated document images and the recording sheet image having an integration pattern same as the integration pattern stored in the memory portion are displayed on the setting screen, in other words, because the user is able to display integrated document images and the sheet image having the same integration pattern on the integration setting screen by means of duplication (copying), it is possible to eliminate the time and labor to generate (display) integrated document images and a sheet image having an the integration pattern same as the one already generated by repeating the same operation from the start. The user thus becomes able to make the integration settings of plural integrated document images across plural sheet images more easily.

Also, in the configurations described above, it is preferable that the integration pattern determining portion is further furnished with a numbering function of automatically numbering the respective integrated document images for the plural recording images in response to an operation instruction input by the user on the setting screen.

According to this configuration, the numbering of the respective integrated document images of plural recording sheet images is performed automatically by the numbering function furnished to the integration pattern determining portion in response to an operation instruction input by the user on the setting screen.

As has been described, because the numbering of the respective integrated document images of plural recording sheet images is performed automatically, the user is able to set an entire integration pattern as he or she desires more easily.

Another aspect of the present invention is directed to a method for forming an image, comprising acquiring a document image; making settings relating to integration for each integrated document image when plural document images are integrated into a recording sheet as integrated document images to thereby determine an integration pattern of the integrated document images for the recording sheet; generating the integrated document images corresponding to the integration pattern from the acquired document images according to the determined integration pattern; and printing the generated integrated document images onto the recording sheet in the integration pattern.

As has been described, in a copying machine or an external device connected to a copying machine, an integration pattern of integrated document images for a recording sheet is determined by making settings relating to the integration for each integrated document image. In other words, an integration setting is made for each integrated document image. Accordingly, the user is able to make an integration pattern made by these integration document images to an integration pattern he or she desires. Also, the integrated document images corresponding to the integration pattern are generated from the document images according to the integration pattern thus set and the integrated document images are printed on the recording sheet in this integration pattern. The user is thus able to make an integrated copy in the integration pattern he or she desires.

This application is based on patent application Nos. 2006-267003, 2007-079526 filed in Japan, the contents of which are hereby incorporated by references.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. An image forming apparatus, comprising:
a document image acquiring portion that acquires a document image;
an integration pattern determining portion that makes settings relating to integration for each integrated document image when plural document images are integrated into a recording sheet as integrated document images and thereby determines an integration pattern of the integrated document images for the recording sheet;
a page number setting portion that sets a page number of the plural document images upon receipt of the instruction about the page number of the plural document images input by the user;
an integrated document image generating portion that generates the integrated document images corresponding to the integration pattern from document images acquired by the document image acquiring portion according to the integration pattern determined by the integration pattern determining portion;
a display portion that displays a setting screen used to make settings relating to the integration of the acquired document images and a recording sheet image representing the recording sheet, and accepts an operation instruction input by a user;

a switching portion that displays plural recording sheet images each including a specific number of the integrated document images on the setting screen by switching in the unit of pages in response to the acceptance of the operation instruction input by the user; and a print portion that prints the integrated document images generated by the integrated document image generating portion onto the recording sheet in the integration pattern, wherein the integration pattern determining portion prepares the recording sheet images distributed in a plurality of pages according to information relating to the page number set by the page number setting portion, makes settings as to movement, rotation and scaling up or down of the respective integrated document images for the recording sheet images in response to the operation instruction input by the user on the setting screen, and determines an entire integration pattern representing an integration pattern of the integrated document images for the recording sheet images by setting an alignment sequence of the document images for the respective integrated document images, the switching portion displays the recording sheet images distributed in the plurality of pages on the setting screen by switching in the unit of pages in response to the operation instruction input by the user in determining the entire integration pattern, the integrated document image generating portion generates the integrated document images corresponding to the entire integration pattern from the document images acquired by the document image acquiring portion according to the entire integration pattern, the integration pattern determining portion is further furnished with a drag processing function of performing at least one of movement, rotation, and scaling up or down processing of the respective integrated document images in response to an instruction input by a dragging operation by the user on the setting screen, the display portion is provided with an integration pattern image display region that displays the integration pattern, and a button document image display region that displays a button document image schematically displaying a document, the display portion displaying information relating to an orientation of a document together with the button document image, with the information relating to the orientation being attached on the button document image itself, the integration pattern determining portion accepts an operation of moving the button document image to the integration pattern image display region by the dragging operation, and the display portion displays the moved button document image as an integrated document image in the integration pattern image display region.

2. The image forming apparatus according to claim 1, wherein:

the integration pattern determining portion is furnished with a recording sheet setting function of setting a size and an orientation of the recording sheet; and the display portion displays the recording sheet image that reflects, of the size and the orientation of the recording sheet set by the recording sheet setting function, at least the orientation together with the integrated document images.

3. The image forming apparatus according to claim 1, wherein:

the integration pattern determining portion is further furnished with a color setting function of making settings as to whether the respective integrated document images are printed in color in response to an operation instruction input by the user on the setting screen.

4. The image forming apparatus according to claim 1, wherein:

the integration pattern determining portion is further furnished with a layout adjusting function of automatically adjusting a layout of the respective integrated document images with respect to the recording sheet image in response to an operation instruction input by the user on the setting screen.

5. The image forming apparatus according to claim 1, wherein:

the integration pattern determining portion determines, as the integration pattern, a first integration pattern for one of a first recording sheet and a first recording sheet group and a second integration pattern different from the first integration pattern for one of a second recording sheet and a second recording sheet group.

6. The image forming apparatus according to claim 1, further comprising:

a memory portion that stores an integration pattern of integrated document images for one recording sheet image among the plural recording sheet images, wherein the display portion displays integrated document images and a recording sheet image having an integration pattern same as the integration pattern stored in the memory portion on the setting screen.

7. The image forming apparatus according to claim 1, wherein:

the integration pattern determining portion is further furnished with a numbering function of automatically numbering the respective integrated document images for the plural recording images in response to an operation instruction input by the user on the setting screen.

8. The image forming apparatus according to claim 1, wherein:

in accepting the setting as to scaling up or down of the respective integrated document images by the user, the display portion displays an instruction input image representing acceptance of specifying instructions of scaling up or down the predetermined fixed integrated document images.

9. The image forming apparatus according to claim 1, wherein the display portion displays information relating to the orientation of the document displayed together with the button document image and also together with the integrated document image.

10. The image forming apparatus according to claim 1, wherein the document image acquiring portion includes a document reading portion that optically reads a document to generate image data, and a document feeding portion that has a document platen on which the document is placed, and feeds the document placed on the document platen to an optically reading position by the document reading portion, and the display portion displays information relating to the orientation of the document on the document platen together with the button document image on the setting screen.

11. The image forming apparatus according to claim 10, wherein:
the display portion displays a document transportation inlet image indicating the orientation of a transportation inlet of the document platen and an arrow specifying the transportation direction of the documents together with the button document image in the button document image display region.

* * * * *